United States Patent
Koyama et al.

(10) Patent No.: US 9,251,748 B2
(45) Date of Patent: *Feb. 2, 2016

(54) METHOD FOR DRIVING LIQUID CRYSTAL DISPLAY DEVICE

(71) Applicant: Semiconductor Energy Laboratory Co., Ltd., Atsugi-shi, Kanagawa-ken (JP)

(72) Inventors: Jun Koyama, Sagamihara (JP); Hiroyuki Miyake, Atsugi (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/548,966

(22) Filed: Nov. 20, 2014

(65) Prior Publication Data

US 2015/0154925 A1    Jun. 4, 2015

Related U.S. Application Data

(60) Division of application No. 14/089,025, filed on Nov. 25, 2013, now Pat. No. 8,922,537, which is a continuation of application No. 12/968,329, filed on Dec. 15, 2010, now Pat. No. 8,599,177.

(30) Foreign Application Priority Data

Dec. 18, 2009    (JP) ................................. 2009-287957

(51) Int. Cl.
   *G09G 3/36*    (2006.01)
   *G06F 3/041*   (2006.01)
   (Continued)

(52) U.S. Cl.
   CPC .............. *G09G 3/3618* (2013.01); *G06F 3/044* (2013.01); *G06F 3/0416* (2013.01);
   (Continued)

(58) Field of Classification Search
   CPC .................... H01L 29/7869; G09G 2330/021; G09G 2310/027; G09G 2300/0809; G09G 2320/10; G09G 3/3618; G09G 3/3648; G09G 2310/04; G09G 2310/061; G09G 2310/08; G09G 2320/103; G09G 2340/0435; G06F 3/0416; G06F 3/0421; G06F 3/044
   USPC ........... 345/87–100, 104, 204–211, 173–175; 257/43, 59

See application file for complete search history.

(56) References Cited

U.S. PATENT DOCUMENTS 5,070,409 A    12/1991    Miyadera et al.
5,534,884 A    7/1996    Mase et al.
(Continued)

FOREIGN PATENT DOCUMENTS

CN    001345024 A    4/2002
CN    001485806 A    3/2004
(Continued)

OTHER PUBLICATIONS

Tsuda.K et al., "Ultra Low Power Consumption Technologies for Mobile TFT-LCDs", IDW '02 : Proceedings of the 9th International Display Workshops, Dec. 4, 2002, pp. 295-298.
(Continued)

*Primary Examiner* — Hong Zhou
(74) *Attorney, Agent, or Firm* — Robinson Intellectual Property Law Office; Eric J. Robinson

(57) ABSTRACT

The liquid crystal display device includes a first substrate provided with a terminal portion, a switching transistor, a driver circuit portion, and a pixel circuit portion including a pixel transistor and a plurality of pixels, a second substrate provided with a common electrode electrically connected to the terminal portion through the switching transistor, and liquid crystal between a pixel electrode and the common electrode. In a period during which a still image is switched to a moving image, the following steps are sequentially performed: a first step of supplying the common potential to the common electrode; a second step of supplying a power supply voltage to the driver circuit portion; a third step of supplying a clock signal to the driver circuit portion; and a fourth step of supplying a start pulse signal to the driver circuit portion.

22 Claims, 13 Drawing Sheets

(51) Int. Cl.
*G06F 3/042* (2006.01)
*G06F 3/044* (2006.01)
*G02F 1/1345* (2006.01)

(52) U.S. Cl.
CPC ............ *G06F 3/0421* (2013.01); *G09G 3/3648* (2013.01); *G09G 3/3655* (2013.01); *G09G 3/3696* (2013.01); *G02F 1/1345* (2013.01); *G09G 2300/0809* (2013.01); *G09G 2310/04* (2013.01); *G09G 2310/061* (2013.01); *G09G 2310/08* (2013.01); *G09G 2320/0209* (2013.01); *G09G 2320/0219* (2013.01); *G09G 2320/10* (2013.01); *G09G 2320/103* (2013.01); *G09G 2330/021* (2013.01); *G09G 2340/0435* (2013.01); *G09G 2340/16* (2013.01); *G09G 2354/00* (2013.01)

(56) References Cited

U.S. PATENT DOCUMENTS

| | | | |
|---|---|---|---|
| 5,731,856 | A | 3/1998 | Kim et al. |
| 5,744,864 | A | 4/1998 | Cillessen et al. |
| 5,982,471 | A | 11/1999 | Hirakata et al. |
| 5,995,237 | A | 11/1999 | Hong |
| 6,294,274 | B1 | 9/2001 | Kawazoe et al. |
| 6,563,174 | B2 | 5/2003 | Kawasaki et al. |
| 6,594,677 | B2 | 7/2003 | Davis et al. |
| 6,727,522 | B1 | 4/2004 | Kawasaki et al. |
| 7,019,738 | B2 | 3/2006 | Tsutsui |
| 7,049,190 | B2 | 5/2006 | Takeda et al. |
| 7,061,014 | B2 | 6/2006 | Hosono et al. |
| 7,064,346 | B2 | 6/2006 | Kawasaki et al. |
| 7,105,868 | B2 | 9/2006 | Nause et al. |
| 7,211,825 | B2 | 5/2007 | Shih et al. |
| 7,212,185 | B2 | 5/2007 | Yanagi et |
| 7,282,782 | B2 | 10/2007 | Hoffman et al. |
| 7,286,108 | B2 | 10/2007 | Tsuda et al. |
| 7,297,977 | B2 | 11/2007 | Hoffman et al. |
| 7,321,353 | B2 | 1/2008 | Tsuda et al. |
| 7,323,356 | B2 | 1/2008 | Hosono et al. |
| 7,385,224 | B2 | 6/2008 | Ishii et al. |
| 7,402,506 | B2 | 7/2008 | Levy et al. |
| 7,411,209 | B2 | 8/2008 | Endo et al. |
| 7,453,065 | B2 | 11/2008 | Saito et al. |
| 7,453,087 | B2 | 11/2008 | Iwasaki |
| 7,462,862 | B2 | 12/2008 | Hoffman et al. |
| 7,468,304 | B2 | 12/2008 | Kaji et al. |
| 7,501,293 | B2 | 3/2009 | Ito et al. |
| 7,674,650 | B2 | 3/2010 | Akimoto et al. |
| 7,732,819 | B2 | 6/2010 | Akimoto et al. |
| 7,791,072 | B2 | 9/2010 | Kumomi et al. |
| 7,791,074 | B2 | 9/2010 | Iwasaki |
| 7,808,495 | B2 | 10/2010 | Tsutsui |
| 7,924,276 | B2 | 4/2011 | Tsuda et al. |
| 8,068,071 | B2 | 11/2011 | Abe et al. |
| 8,217,877 | B2 | 7/2012 | Fukutome |
| 8,243,055 | B2 | 8/2012 | Abe |
| 8,300,005 | B2 | 10/2012 | Tateuchi et al. |
| 8,599,177 | B2 | 12/2013 | Koyama et al. |
| 2001/0024187 | A1 | 9/2001 | Sato et al. |
| 2001/0046027 | A1 | 11/2001 | Tai et al. |
| 2002/0036604 | A1 | 3/2002 | Yamazaki et al. |
| 2002/0056838 | A1 | 5/2002 | Ogawa |
| 2002/0059489 | A1 | 5/2002 | Davis et al. |
| 2002/0060660 | A1 | 5/2002 | Yamasaki |
| 2002/0075205 | A1 | 6/2002 | Kimura et al. |
| 2002/0132454 | A1 | 9/2002 | Ohtsu et al. |
| 2003/0189401 | A1 | 10/2003 | Kido et al. |
| 2003/0218222 | A1 | 11/2003 | Wager, III et al. |
| 2004/0008171 | A1 | 1/2004 | Kimura et al. |
| 2004/0036669 | A1 | 2/2004 | Yanagi et al. |
| 2004/0038446 | A1 | 2/2004 | Takeda et al. |
| 2004/0127038 | A1 | 7/2004 | Carcia et al. |
| 2004/0130516 | A1 | 7/2004 | Nathan et al. |
| 2005/0017302 | A1 | 1/2005 | Hoffman |
| 2005/0140632 | A1 | 6/2005 | Tsuda et al. |
| 2005/0199959 | A1 | 9/2005 | Chiang et al. |
| 2005/0253829 | A1 | 11/2005 | Mamba et al. |
| 2006/0035452 | A1 | 2/2006 | Carcia et al. |
| 2006/0043377 | A1 | 3/2006 | Hoffman et al. |
| 2006/0091793 | A1 | 5/2006 | Baude et al. |
| 2006/0108529 | A1 | 5/2006 | Saito et al. |
| 2006/0108636 | A1 | 5/2006 | Sano et al. |
| 2006/0110867 | A1 | 5/2006 | Yabuta et al. |
| 2006/0113536 | A1 | 6/2006 | Kumomi et al. |
| 2006/0113539 | A1 | 6/2006 | Sano et al. |
| 2006/0113549 | A1 | 6/2006 | Den et al. |
| 2006/0113565 | A1 | 6/2006 | Abe et al. |
| 2006/0146005 | A1 | 7/2006 | Baba et al. |
| 2006/0169973 | A1 | 8/2006 | Isa et al. |
| 2006/0170111 | A1 | 8/2006 | Isa et al. |
| 2006/0182425 | A1 | 8/2006 | Boerger et al. |
| 2006/0197092 | A1 | 9/2006 | Hoffman et al. |
| 2006/0208977 | A1 | 9/2006 | Kimura |
| 2006/0228974 | A1 | 10/2006 | Thelss et al. |
| 2006/0231882 | A1 | 10/2006 | Kim et al. |
| 2006/0238135 | A1 | 10/2006 | Kimura |
| 2006/0244107 | A1 | 11/2006 | Sugihara et al. |
| 2006/0267972 | A1 | 11/2006 | Yi |
| 2006/0284171 | A1 | 12/2006 | Levy et al. |
| 2006/0284172 | A1 | 12/2006 | Ishii |
| 2006/0292777 | A1 | 12/2006 | Dunbar |
| 2007/0024187 | A1 | 2/2007 | Shin et al. |
| 2007/0046191 | A1 | 3/2007 | Saito |
| 2007/0052025 | A1 | 3/2007 | Yabuta |
| 2007/0054507 | A1 | 3/2007 | Kaji et al. |
| 2007/0090365 | A1 | 4/2007 | Hayashi et al. |
| 2007/0108446 | A1 | 5/2007 | Akimoto |
| 2007/0152217 | A1 | 7/2007 | Lai et al. |
| 2007/0172591 | A1 | 7/2007 | Seo et al. |
| 2007/0187678 | A1 | 8/2007 | Hirao et al. |
| 2007/0187760 | A1 | 8/2007 | Furuta et al. |
| 2007/0194379 | A1 | 8/2007 | Hosono et al. |
| 2007/0252928 | A1 | 11/2007 | Ito et al. |
| 2007/0272922 | A1 | 11/2007 | Kim et al. |
| 2007/0273682 | A1 | 11/2007 | Yi et al. |
| 2007/0287296 | A1 | 12/2007 | Chang |
| 2008/0006877 | A1 | 1/2008 | Mardilovich et al. |
| 2008/0038882 | A1 | 2/2008 | Takechi et al. |
| 2008/0038929 | A1 | 2/2008 | Chang |
| 2008/0050595 | A1 | 2/2008 | Nakagawara et al. |
| 2008/0055218 | A1 | 3/2008 | Tsuda et al. |
| 2008/0073653 | A1 | 3/2008 | Iwasaki |
| 2008/0083950 | A1 | 4/2008 | Pan et al. |
| 2008/0106191 | A1 | 5/2008 | Kawase |
| 2008/0128689 | A1 | 6/2008 | Lee et al. |
| 2008/0129195 | A1 | 6/2008 | Ishizaki et al. |
| 2008/0158217 | A1 | 7/2008 | Hata et al. |
| 2008/0166834 | A1 | 7/2008 | Kim et al. |
| 2008/0170028 | A1 | 7/2008 | Yoshida |
| 2008/0182358 | A1 | 7/2008 | Cowdery-Corvan et al. |
| 2008/0224133 | A1 | 9/2008 | Park et al. |
| 2008/0254569 | A1 | 10/2008 | Hoffman et al. |
| 2008/0258139 | A1 | 10/2008 | Ito et al. |
| 2008/0258140 | A1 | 10/2008 | Lee et al. |
| 2008/0258141 | A1 | 10/2008 | Park et al. |
| 2008/0258143 | A1 | 10/2008 | Kim et al. |
| 2008/0284710 | A1* | 11/2008 | Kimura et al. .................. 345/98 |
| 2008/0284970 | A1 | 11/2008 | Ishitani |
| 2008/0296568 | A1 | 12/2008 | Ryu et al. |
| 2009/0008638 | A1 | 1/2009 | Kang et al. |
| 2009/0068773 | A1 | 3/2009 | Lai et al. |
| 2009/0073325 | A1 | 3/2009 | Kuwabara et al. |
| 2009/0079682 | A1 | 3/2009 | Yamato et al. |
| 2009/0114910 | A1 | 5/2009 | Chang |
| 2009/0134399 | A1 | 5/2009 | Sakakura et al. |
| 2009/0152506 | A1 | 6/2009 | Umeda et al. |
| 2009/0152541 | A1 | 6/2009 | Maekawa et al. |
| 2009/0166616 | A1 | 7/2009 | Uchiyama |
| 2009/0230392 | A1 | 9/2009 | Takahara |
| 2009/0244028 | A1 | 10/2009 | Matsuo |
| 2009/0251445 | A1 | 10/2009 | Ito et al. |
| 2009/0261325 | A1 | 10/2009 | Kawamura et al. |

(56) References Cited

U.S. PATENT DOCUMENTS

| | | | |
|---|---|---|---|
| 2009/0278122 | A1 | 11/2009 | Hosono et al. |
| 2009/0280600 | A1 | 11/2009 | Hosono et al. |
| 2009/0294764 | A1 | 12/2009 | Kim et al. |
| 2010/0033748 | A1* | 2/2010 | Enami et al. ............... 358/1.13 |
| 2010/0065844 | A1 | 3/2010 | Tokunaga |
| 2010/0092800 | A1 | 4/2010 | Itagaki et al. |
| 2010/0109002 | A1 | 5/2010 | Itagaki et al. |
| 2010/0149138 | A1 | 6/2010 | Lee et al. |
| 2010/0153876 | A1 | 6/2010 | Kim et al. |
| 2010/0289020 | A1 | 11/2010 | Yano et al. |
| 2011/0124138 | A1 | 5/2011 | Takahara |
| 2014/0368486 | A1 | 12/2014 | Hata et al. |

FOREIGN PATENT DOCUMENTS

| | | |
|---|---|---|
| CN | 001486466 A | 3/2004 |
| EP | 1189192 A | 3/2002 |
| EP | 1296174 A | 3/2003 |
| EP | 1391871 A | 2/2004 |
| EP | 1737044 A | 12/2006 |
| EP | 1798630 A | 6/2007 |
| EP | 1835486 A | 9/2007 |
| EP | 1939842 A | 7/2008 |
| EP | 2226847 A | 9/2010 |
| EP | 2309485 A | 4/2011 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 03-219287 A | 9/1991 |
| JP | 05-251705 A | 9/1993 |
| JP | 06-067795 A | 3/1994 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2000-267066 A | 9/2000 |
| JP | 2001-312253 A | 11/2001 |
| JP | 2002-076356 A | 3/2002 |
| JP | 2002-169499 A | 6/2002 |
| JP | 2002-289859 A | 10/2002 |
| JP | 2003-086000 A | 3/2003 |
| JP | 2003-086808 A | 3/2003 |
| JP | 2004-078124 A | 3/2004 |
| JP | 2004-103957 A | 4/2004 |
| JP | 2004-151222 A | 5/2004 |
| JP | 2004-273614 A | 9/2004 |
| JP | 2004-273732 A | 9/2004 |
| JP | 2005-300948 A | 10/2005 |
| JP | 2006-165528 A | 6/2006 |
| JP | 2007-163891 A | 6/2007 |
| JP | 2007-279701 A | 10/2007 |
| JP | 2007-316431 A | 12/2007 |
| JP | 2008-065225 A | 3/2008 |
| JP | 2008-170749 A | 7/2008 |
| JP | 2008-181108 A | 8/2008 |
| JP | 2008-233925 A | 10/2008 |
| JP | 2009-116324 A | 5/2009 |
| JP | 2009-224595 A | 10/2009 |
| JP | 2009-251607 A | 10/2009 |
| JP | 5211255 | 6/2013 |
| KR | 2004-0018191 A | 3/2004 |
| TW | 488154 | 5/2002 |
| TW | I225630 | 12/2004 |
| TW | 200701768 | 1/2007 |
| TW | 200703112 | 1/2007 |
| TW | 200945067 | 11/2009 |
| WO | WO-02/052450 | 7/2002 |
| WO | WO-02/056191 | 7/2002 |
| WO | WO-2004/114391 | 12/2004 |
| WO | WO-2009/051050 | 4/2009 |
| WO | WO-2009/075281 | 6/2009 |
| WO | WO-2011/074393 | 6/2011 |

OTHER PUBLICATIONS

International Search Report (Application No. PCT/JP2010/071204) Dated Mar. 8, 2011.

Written Opinion (Application No. PCT/JP2010/071204) Dated Mar. 8, 2011.

Fortunato.E et al., "Wide-Bandgap High-Mobility ZNO Thin-Film Transistors Produced at Room Temperature", Appl. Phys. Lett. (Applied Physics Letters), Sep. 27, 2004, vol. 85, No. 13, pp. 2541-2543.

Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.

Ikeda.T et al., "Full-Functional System Liquid Crystal Display Using CG-Silicon Technology", SID Digest '04 : SID International Symposium Digest of Technical Papers, 2004, vol. 35, pp. 860-863.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Hayashi.R et al., "42.1: Invited Paper: Improved Amorphous In—Ga—Zn—O TFTs", SID Digest '08 : SID International Symposium Digest of Technical Papers, May 20, 2008, vol. 39, pp. 621-624.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Nakamura.M et al., "The phase relations in the $In_2O_3$—$Ga_2ZnO_4$—ZnO system at 1350 °C.", Journal of Solid State Chemistry, Aug. 1, 1991, vol. 93, No. 2, pp. 298-315.

Kimizuka.N et al., "Syntheses and Single-Crystal Data of Homologous Compounds, $In_2O_3(ZnO)m$ (m = 3, 4, and 5), $InGaO_3(ZnO)3$, and $Ga_2O_3(ZnO)m$ (m = 7, 8, 9, and 16) in the $In_2O_3$—$ZnGa_2O_4$—ZnO System", Journal of Solid State Chemistry, Apr. 1, 1995, vol. 116, No. 1, pp. 170-178.

Nomura.K at al., "Thin-Film Transistor Fabricated in Single-Crystalline Transparent Oxide Semiconductor", Science, May 23, 2003, vol. 300, No. 5623, pp. 1269-1272.

Masuda.S et al., "Transparent thin film transistors using ZnO as an active channel layer and their electrical properties", J. Appl. Phys. (Journal of Applied Physics), Feb. 1, 2003, vol. 93, No. 3, pp. 1624-1630.

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.

Osada.T et al., "15.2: Development of Driver-Integrated Panel using Amorphous In—Ga—Zn—Oxide TFT", SID Digest '09 : SID International Symposium Digest of Technical Papers, May 31, 2009, pp. 184-187.

Nomura.K et al., "Carrier transport in transparent oxide semiconductor with intrinsic structural randomness probed using single-crystalline $InGaO_3(ZnO)5$ films", Appl. Phys. Lett. (Applied Physics Letters), Sep. 13, 2004, vol. 85, No. 11, pp. 1993-1995.

Li.C et al., "Modulated Structures of Homologous Compounds $InMO_3(ZnO)m$ (M=In,Ga; m=Integer) Described by Four-Dimensional Superspace Group", Journal of Solid State Chemistry, 1998, vol. 139, pp. 347-355.

Son.K et al., "42.4L: Late-News Paper: 4 Inch QVGA AMOLED Driven by the Threshold Voltage Controlled Amorphous GIZO ($Ga_2O_3$—$In_2O_3$—ZnO) TFT", SID Digest '08 : SID International Symposium Digest of Technical Papers, May 20, 2008, vol. 39, pp. 633-636.

(56) References Cited

OTHER PUBLICATIONS

Lee.J et al., "World'S Largest (15-Inch) XGA AMLCD Panel Using IGZO Oxide TFT", SID Digest '08 : SID International Symposium Digest of Technical Papers, May 20, 2008, vol. 39, pp. 625-628.

Nowatari.H et al., "60.2: Intermediate Connector With Suppressed Voltage Loss for White Tandem OLEDS", SID Digest '09 : SID International Symposium Digest of Technical Papers, May 31, 2009, vol. 40, pp. 899-902.

Kanno.H et al., "White Stacked Electrophosphorecent Organic Light-Emitting Devices Employing MoO3 as a Charge-Generation Layer", Adv. Mater. (Advanced Materials), 2006, vol. 18, No. 3, pp. 339-342.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.

Jeong.J et al., "3.1: Distinguished Paper: 12.1-Inch WXGA AMOLED Display Driven by Indium—Gallium—Zinc Oxide TFTs Array", SID Digest '08 : SID International Symposium Digest of Technical Papers, May 20, 2008, vol. 39, No. 1, pp. 1-4.

Park.J et al., "High performance amorphous oxide thin film transistors with self-aligned top-gate structure", IEDM 09: Technical Digest of International Electron Devices Meeting, Dec. 7, 2009, pp. 191-194.

Kurokawa.Y et al., "UHF RFCPUS on Flexible and Glass Substrates for Secure RFID Systems", Journal of Solid-State Circuits , 2008, vol. 43, No. 1, pp. 292-299.

Ohara.H et al., "Amorphous In—Ga—Zn—Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.

Cho.D et al., "21.2:Al and Sn-Doped Zinc Indium Oxide Thin Film Transistors for AMOLED Back-Plane", SID Digest '09 : SID International Symposium Digest of Technical Papers, May 31, 2009, pp. 280-283.

Lee.M et al., "15.4:Excellent Performance of Indium—Oxide-Based Thin-Film Transistors by DC Sputtering", SID Digest '09 : SID International Symposium Digest of Technical Papers, May 31, 2009, pp. 191-193.

Jin.D et al., "65.2:Distinguished Paper:World-Largest (6.5") Flexible Full Color Top Emission AMOLED Display on Plastic Film and Its Bending Properties", SID Digest '09 : SID International Symposium Digest of Technical Papers, May 31, 2009, pp. 983-985.

Sakata.J et al., "Development of 4.0-In. AMOLED Display With Driver Circuit Using Amorphous In—Ga—Zn—Oxide TFTs", IDW '09 : Proceedings of the 16th International Display Workshops, 2009, pp. 689-692.

Park.J et al., "Amorphous Indium—Gallium—Zinc Oxide TFTs and Their Application for Large Size AMOLED", AM-FPD '08 Digest of Technical Papes, Jul. 2, 2008, pp. 275-278.

Park.S et al., "Challenge to Future Displays: Transparent AM-OLED Driven by PEALD Grown ZnO TFT", IMID '07 Digest, 2007, pp. 1249-1252.

Godo.H et al., "Temperature Dependence of Characteristics and Electronic Structure for Amorphous In—Ga—Zn—Oxide TFT", AM-FPD '09 Digest of Technical Papers, Jul. 1, 2009, pp. 41-44.

Osada.T et al., "Development of Driver-Integrated Panel Using Amorphous In—Ga—Zn—Oxide TFT", AM-FPD '09 Digest of Technical Papers, Jul. 1, 2009, pp. 33-36.

Hirao.T et al., "Novel Top-Gate Zinc Oxide Thin-Film Transistors (ZnO TFTs) for AMLCDs", J. Soc. Inf. Display (Journal of the Society for Information Display), 2007, vol. 15, No. 1, pp. 17-22.

Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.

Godo.H et al., "P-9:Numerical Analysis on Temperature Dependence of Characteristics of Amorphous In—Ga—Zn—Oxide TFT", SID Digest '09 : SID International Symposium Digest of Technical Papers, May 31, 2009, pp. 1110-1112.

Ohara.H et al., "21.3:4.0 In. QVGA AMOLED Display Using In—Ga—Zn—Oxide TFTs With a Novel Passivation Layer", SID Digest '09 : SID International Symposium Digest of Technical Papers, May 31, 2009, pp. 284-287.

Miyasaka.M, "Suftla Flexible Microelectronics on Their Way to Business", SID Digest '07 : SID International Symposium Digest of Technical Papers, 2007, vol. 38, pp. 1673-1676.

Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.

Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.

Asaoka.Y et al., "29.1: Polarizer-Free Reflective LCD Combined With Ultra Low-Power Driving Technology", SID Digest '09 : SID International Symposium Digest of Technical Papers, May 31, 2009, pp. 395-398.

Lee.H et al., "Current Status of, Challenges to, and Perspective View of AM-OLED", IDW '06 : Proceedings of the 13th International Display Workshops, Dec. 7, 2006, pp. 663-666.

Kikuchi.H et al., "62.2:Invited Paper:Fast Electro-Optical Switching in Polymer-Stabilized Liquid Crystalline Blue Phases for Display Application", SID Digest '07 : SID International Symposium Digest of Technical Papers, 2007, vol. 38, pp. 1737-1740.

Nakamura.M, "Synthesis of Homologous Compound with New Long-Period Structure", NIRIM Newsletter, Mar. 1, 1995, vol. 150, pp. 1-4.

Kikuchi.H et al., "Polymer-Stabilized Liquid Crystal Blue Phases", Nature Materials, Sep. 2, 2002, vol. 1, pp. 64-68.

Kimizuka.N et al., "Spinel,YBFe2O4, and YB2Fe3O7 Types of Structures for Compounds in the In2O3 and SC2O3—A2O3—BO Systems [A; Fe, Ga, or Al; B: Mg, Mn, Fe, Ni, Cu,or Zn] at Temperatures over 1000°C.", Journal of Solid State Chemistry, 1985, vol. 60, pp. 382-384.

Kitzerow.H et al., "Observation of Blue Phases in Chiral Networks", Liquid Crystals, 1993, vol. 14, No. 3, pp. 911-916.

Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.

Meiboom.S et al., "Theory of the Blue Phase of Cholesteric Liquid Crystals", Phys. Rev. Lett. (Physical Review Letters), May 4, 1981, vol. 46, No. 18, pp. 1216-1219.

Park.Sang-Hee et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Orita.M et al., "Mechanism of Electrical Conductivity of Transparent InGaZnO4", Phys. Rev. B (Physical Review. B), Jan. 15, 2000, vol. 61, No. 3, pp. 1811-1816.

Nomura.K et al., "Amorphous Oxide Semiconductors for High-Performance Flexible Thin-Film Transistors", Jpn. J. Appl. Phys. (Japanese Journal of Applied Physics) , 2006, vol. 45, No. 5B, pp. 4303-4308.

Janotti.A et al., "Native Point Defects in ZnO", Phys. Rev. B (Physical Review. B), Oct. 4, 2007, vol. 76, No. 16, pp. 165202-1-165202-22.

Park.J et al., "Electronic Transport Properties of Amorphous Indium—Gallium—Zinc Oxide Semiconductor Upon Exposure to Water", Appl. Phys. Lett. (Applied Physics Letters) , 2008, vol. 92, pp. 072104-1-072104-3.

Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.

(56) References Cited

OTHER PUBLICATIONS

Janotti.A et al., "Oxygen Vacancies in ZnO", Appl. Phys. Lett. (Applied Physics Letters), 2005, vol. 87, pp. 122102-1-122102-3.

Oba.F et al., "Defect energetics in ZnO: A hybrid Hartree-Fock density functional study", Phys. Rev. B (Physical Review. B), 2008, vol. 77, pp. 245202-1-245202-6.

Orita.M et al., "Amorphous transparent conductive oxide InGaO3(ZnO)m (m<4):a Zn4s conductor", Philosophical Magazine, 2001, vol. 81, No. 5, pp. 501-515.

Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.

Mo.Y et al., "Amorphous Oxide TFT Backplanes for Large Size AMOLED Displays", IDW '08 : Proceedings of the 6th International Display Workshops, Dec. 3, 2008, pp. 581-584.

Kim.S et al., "High-Performance oxide thin film transistors passivated by various gas plasmas", 214th ECS Meeting, 2008, No. 2317, ECS.

Clark.S et al., "First Principles Methods Using Castep", Zeitschrift fur Kristallographie, 2005, vol. 220, pp. 567-570.

Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ueno.K et al., "Field-Effect Transistor on SrTiO3 With Sputtered Al2O3 Gate Insulator", Appl. Phys. Lett. (Applied Physics Letters), Sep. 1, 2003, vol. 83, No. 9, pp. 1755-1757.

Japanese Office Action (Application No. 2014-051046) Dated May 20, 2014.

Chinese Office Action (Application No. 201080057193.4) Dated Jul. 2, 2014.

European Search Report (Application No. 10837422.4) Dated Nov. 14, 2014.

\* cited by examiner

METHOD FOR DRIVING LIQUID CRYSTAL DISPLAY DEVICE

TECHNICAL FIELD

The present invention relates to a method for driving a liquid crystal display device.

BACKGROUND ART

Liquid crystal display devices ranging from a large display device such as a television receiver to a small display device such as a mobile phone have been spreading. From now on, products with higher added values will be needed and are being developed. In recent years, in view of increase in concern about global environment and improvement in convenience of mobile equipment, development of liquid crystal display devices with low power consumption has attracted attention.

Patent Document 1 discloses a structure of a liquid crystal display device where all data signal lines are electrically isolated from a data signal driver, which results in a high impedance state, in order to maintain constant potentials of data signal lines in an idle period during which all gate lines and all the signal lines are not selected. This structure allows reduction in power consumption of the liquid crystal display device.

Non-Patent Document 1 discloses a structure of a liquid crystal display device where refresh rates differ between the case of moving image display and the case of still image display for reduction in power consumption of the liquid crystal display device. Non-Patent Document 1 also discloses a structure where AC signals with the same phase are supplied to a signal line and a common electrode also in an idle period so that fluctuation in drain-common voltage can be prevented, in order to prevent perception of flickers due to the fluctuation in drain-common voltage, which is caused by switch of signals between the idle period and a scan period in the case of still image display.

REFERENCE

[Patent Document 1] Japanese Published Patent Application No. 2001-312253
[Non-Patent Document 1] Kazuhiko Tsuda et al., IDW'02, pp. 295-298

DISCLOSURE OF INVENTION

When complex driving is performed in a liquid crystal display device as in the structures of Patent Document 1 and Non-Patent Document 1, the structure and operation of a driver circuit which supplies signals to gate lines and signal lines are complicated and thus power consumption of the liquid crystal display device cannot be reduced sufficiently.

In the case where refresh rates differ between the case of moving image display and the case of still image display as in the structure of Non-Patent Document 1, the refresh rate in the case of still image display needs to be significantly decreased to further reduce power consumption of a liquid crystal display device. However, when the refresh rate in the case of still image display is significantly decreased, images displayed in a period during which image signals are held are deteriorated due to the following problem(s): leakage of charge to be held in a pixel electrode from a pixel transistor and/or disorder of an image signal between a pixel electrode and a common electrode due to noise or the like.

In view of the above problems, an object of an embodiment of the present invention is to suppress deterioration of images displayed in a liquid crystal display device by reducing the refresh rate in the case of still image display, without complex operation of a driver circuit.

An embodiment of the present invention is a method for driving a liquid crystal display device including the following. In a period during which a moving image is displayed, a pixel transistor including an oxide semiconductor layer which is electrically connected to a driver circuit portion formed over a first substrate is turned on so that an image signal is supplied to a pixel electrode, and a switching transistor including an oxide semiconductor layer which is electrically connected to a terminal portion formed over the first substrate is turned on so that a common potential is supplied to a common electrode which is electrically connected to the terminal portion through the switching transistor and which is formed over a second substrate. In a period during which a still image is displayed, the pixel transistor is turned off so that the pixel electrode is in an electrically floating state, and the switching transistor is turned off so that the common electrode is in an electrically floating state. In a period during which a still image is switched to a moving image, the following steps are sequentially performed: a first step of supplying the common potential to the common electrode; a second step of supplying a power supply voltage to the driver circuit portion; a third step of supplying a clock signal to the driver circuit portion; and a fourth step of supplying a start pulse signal to the driver circuit portion.

Another embodiment of the present invention is a method for driving a liquid crystal display device including the following. In a period during which a moving image is displayed, a pixel transistor including an oxide semiconductor layer which is electrically connected to a driver circuit portion formed over a first substrate is turned on so that an image signal is supplied to a pixel electrode, and a switching transistor including an oxide semiconductor layer which is electrically connected to a terminal portion formed over the first substrate is turned on so that a common potential is supplied to a common electrode which is electrically connected to the terminal portion through the switching transistor and which is formed over a second substrate. In a period during which a still image is displayed, the pixel transistor is turned off so that the pixel electrode is in an electrically floating state, and the switching transistor is turned off so that the common electrode is in an electrically floating state. In a period during which a moving image is switched to a still image, the following steps are sequentially performed: a first step of stopping supply of a start pulse signal to the driver circuit portion; a second step of stopping supply of a clock signal to the driver circuit portion; a third step of stopping supply of a power supply voltage to the driver circuit portion; and a fourth step of stopping supply of the common potential to the common electrode.

According to one of the embodiments of the present invention, the method for driving a liquid crystal display device may be a method for driving a liquid crystal display device including a memory circuit which stores image signals; a comparator circuit which compares the image signals in each pixel and calculates a difference; and a display control circuit which controls the driver circuit and reads out the image signals. In the comparator circuit, the image signals stored in the memory circuit in successive frame periods are read out and compared in each pixel to compare a difference, so that whether a moving image or a still image is displayed is determined.

According to one of the embodiments of the present invention, the method for driving a liquid crystal display device may be a method in which a conduction state or a non-conduction state between the common electrode and the terminal portion to which the common potential is supplied is controlled by the switching transistor in accordance with a signal supplied from the display control circuit to a gate terminal of the switching transistor.

According to one of the embodiments of the present invention, the driving method of a liquid crystal display device may be a method in which the switching transistor has an off current per micrometer in channel width of 10 zA/μm or less at room temperature, and a conduction state or a non-conduction state between the common electrode and the terminal portion to which the common potential is supplied is controlled by the switching transistor.

According to one of the embodiments of the present invention, even if a refresh rate in the case of still image display is decreased, deterioration of displayed images can be suppressed.

BEST MODE FOR CARRYING OUT THE INVENTION

Figure 1:
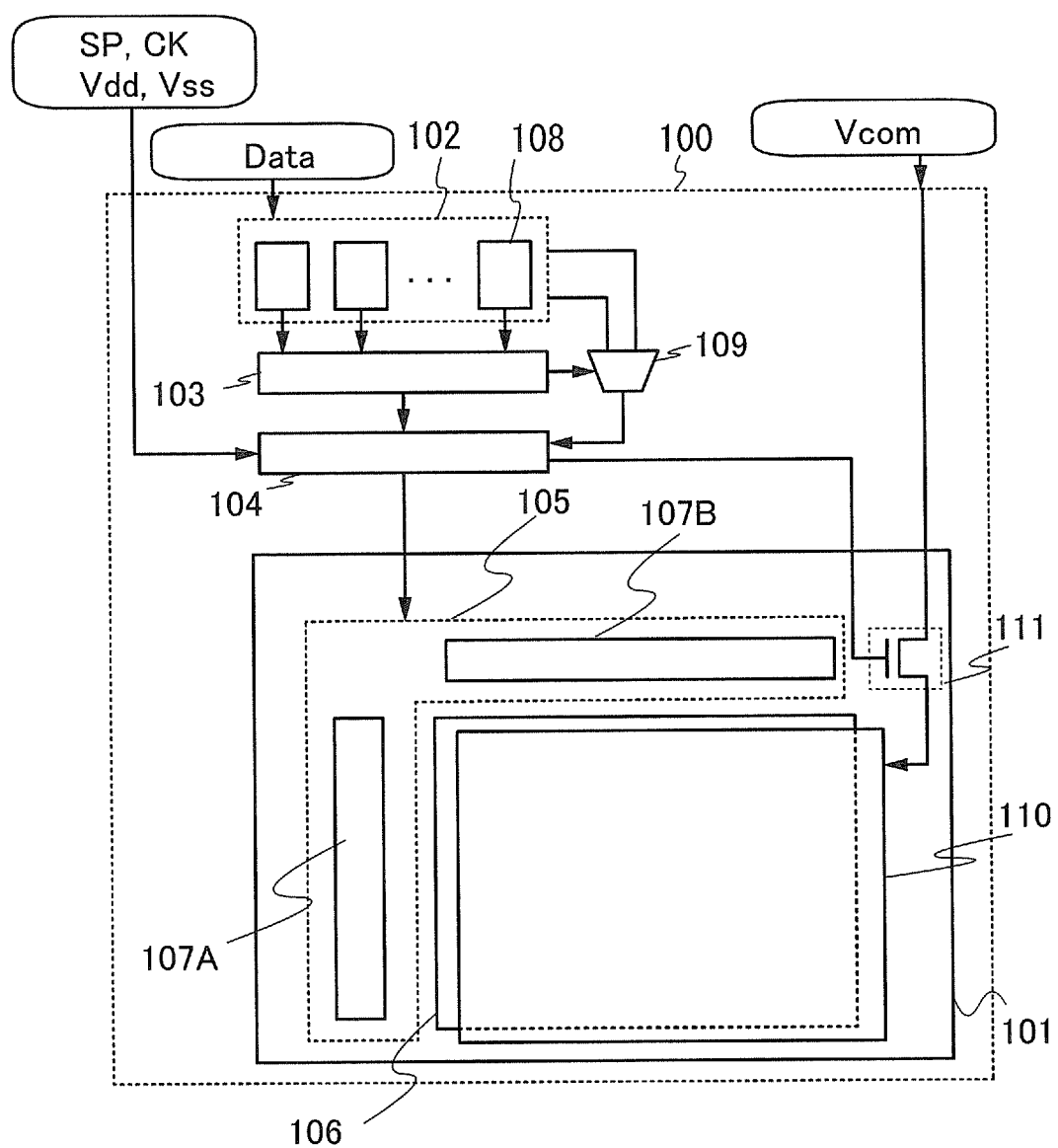
FIG. 1 illustrates a liquid crystal display device according to an embodiment of the present invention.

Hereinafter, embodiments of the present invention will be described with reference to the accompanying drawings. However, the present invention can be carried out in many different modes, and it is easily understood by those skilled in the art that modes and details of the present invention can be modified in various ways without departing from the purpose and the scope of the present invention. Therefore, the present invention should not be construed as being limited to the following description of the embodiments. Note that in structures of the present invention described below, identical portions are denoted by the same reference numerals in different drawings.

Note that the size, the thickness of a layer, or distortion of the waveform of a signal of each of structures illustrated in the drawings and the like in the embodiments is exaggerated for simplicity in some cases. Therefore, embodiments of the present invention are not limited to such scales.

Note that in this specification, terms such as "first", "second", "third", and "N-th" (N is a natural number) are used in order to avoid confusion among components and do not limit the number of the components.

(Embodiment 1)

In this embodiment, block diagrams, timing charts, and the like of liquid crystal display devices will be described.

First, FIG. 1 is a block diagram of a liquid crystal display device, which illustrates components of the liquid crystal display device of this specification.

A liquid crystal display device 100 in FIG. 1 includes a display panel 101, a memory circuit 102, a comparator circuit 103, a display control circuit 104, and a selection circuit 109.

The display panel 101 includes, for example, a driver circuit portion 105, a pixel circuit portion 106, a common electrode portion 110, and a switching transistor 111. The driver circuit portion 105 includes a gate line driver circuit 107A and a signal line driver circuit 107B.

The gate line driver circuit 107A and the signal line driver circuit 107B are driver circuits for driving the pixel circuit portion 106 including a plurality of pixels. The gate line driver circuit 107A and the signal line driver circuit 107B each include a shift register circuit. The gate line driver circuit 107A, the signal line driver circuit 107B, the pixel circuit portion 106, and the switching transistor 111 are formed using thin film transistors formed over one substrate. Note that the gate line driver circuit 107A and the signal line driver circuit 107B, and the pixel circuit portion 106 and the switching transistor 111 may be formed over different substrates.

A high power supply potential Vdd, a low power supply potential Vss, a start pulse SP, a clock signal CK, and an image signal Data are supplied to the driver circuit portion 105 by control of the display control circuit 104. A common potential Vcom is supplied to the common electrode portion 110 through the switching transistor 111 by control of the display control circuit 104.

Note that a high power supply potential Vdd refers to a potential which is higher than a reference potential, and a low power supply potential refers to a potential which is lower than or equal to the reference potential. It is desirable that each of the high power supply potential and the low power supply potential be a potential at which a thin film transistor can operate. A potential difference between the high power supply potential Vdd and the low power supply potential Vss is referred to as a power supply voltage in some cases.

Note that a voltage refers to a potential difference between a given potential and a reference potential (e.g., a ground potential) in many cases. Accordingly, a voltage can also be referred to as a potential.

A common potential Vcom may be any potential as long as it serves as reference with respect to a potential of an image signal Data supplied to a pixel electrode. For example, the common potential Vcom may be a ground potential. Note that the image signal Data may be appropriately inverted in accordance with dot inversion driving, source line inversion driving, gate line inversion driving, frame inversion driving, or the like to be input to the display panel 101.

Note that in the case where an image signal for displaying a moving image or a still image which is supplied to the memory circuit 102 is an analog signal, the image signal may be converted into a digital signal through an A/D converter or the like to be supplied to the memory circuit 102. The image signal is converted into a digital signal in advance, whereby detection of a difference between image signals that is to be performed later can be easily performed, which is preferable.

The memory circuit 102 includes a plurality of frame memories 108 for storing image signals for a plurality of frames. The number of frame memories 108 included in the memory circuit 102 is not particularly limited and the memory circuit 102 may be an element that can store image signals of a plurality of frames. Note that the frame memory 108 may be formed using a memory element such as a dynamic random access memory (DRAM) or a static random access memory (SRAM).

The number of the frame memories 108 is not particularly limited as long as an image signal can be stored for each frame period. The image signals of the frame memories 108 are selectively read out by the comparator circuit 103 and the selection circuit 109.

Note that a switching transistor is an element formed of a thin film transistor in which conduction or non-conduction between two terminals, i.e., a source terminal and a drain terminal, is selected in accordance with a voltage applied to a gate to realize switching operation.

In the structure according to this embodiment, an oxide semiconductor is used for a semiconductor layer of a thin film transistor included in each of the pixel circuit portion 106 and the switching transistor 111. The oxide semiconductor is an oxide semiconductor made to be an intrinsic (i-type) or substantially intrinsic by removal of hydrogen that is an n-type impurity to be highly purified so that impurities that are not main components of the oxide semiconductor are contained as little as possible. That is, a feature is that a highly purified i-type (intrinsic) semiconductor or a substantially i-type semiconductor is obtained not by adding an impurity but by reducing an impurity such as hydrogen or water as much as possible. Thus, an oxide semiconductor layer included in a thin film transistor is highly purified to become electrically i-type (intrinsic).

In addition, a highly purified oxide semiconductor includes extremely few carriers (close to zero), and the carrier concentration thereof is lower than $1\times10^{14}/cm^3$, preferably lower than $1\times10^{12}/cm^3$, more preferably $1\times10^{11}/cm^3$.

Since the oxide semiconductor includes extremely few carriers, the off current can be reduced in a transistor. Specifically, in a thin film transistor including the above oxide semiconductor layer, the off current per micrometer in channel width can be less than or equal to 10 aA/μm ($1\times10^{-17}$ A/μm), preferably less than or can be equal to 1 aA/μm ($1\times10^{-18}$ A/μm), more preferably 10 zA/μm ($1\times10^{-20}$ A/μm). That is to say, in circuit design, the oxide semiconductor layer can be regarded as an insulator when the thin film transistor is off. On the other hand, when a thin film transistor including an oxide semiconductor layer is on, the current supply capability of the thin film transistor including an oxide semiconductor layer is expected to be higher than that of a thin film transistor including a semiconductor layer formed of amorphous silicon.

When a thin film transistor having a significantly low off current is used for the pixel circuit portion 106, a pixel electrode can be electrically isolated from signal lines which may cause fluctuation in potential of the pixel electrode of each pixel. Thus, fluctuation in potential of the pixel electrode due to fluctuation in potential of the signal line can be suppressed. Further, a thin film transistor having a significantly low off current is used for the switching transistor 111, whereby the common electrode portion can be isolated from an external terminal portion to which the common potential Vcom is supplied, and the common electrode portion can be brought into an electrically floating state. Thus, fluctuation in voltage applied to both electrodes of a liquid crystal element, due to noise or the like, can be suppressed.

When an oxide semiconductor is used for a semiconductor layer of a thin film transistor included in each of the pixel circuit portion 106 and the switching transistor 111, the refresh rate is reduced, so that a period during which the gate line driver circuit and the signal line driver circuit do not operate in a period during which a still image is displayed is significantly extended, and display of a pixel can be maintained as it is. Consequently, without complex operations of the driver circuits, supply of a signal for driving the gate line driver circuit and the signal line driver circuit can be stopped for a longer time and power consumption can be reduced. Note that there is absolutely no problem when a potential of a pixel electrode of each pixel is refreshed approximately every minute or longer in the case of using a thin film transistor including an oxide semiconductor having an extremely low off current. Further, when an oxide semiconductor is used for the semiconductor layer of the thin film transistor included in each of the pixel circuit portion 106 and the switching transistor 111, both electrodes of the liquid crystal element can be in a floating state, and thus deterioration of displayed images due to noise or the like can be suppressed.

As the oxide semiconductor layer, a four-component metal oxide film such as an In—Sn—Ga—Zn—O-based film; a three-component metal oxide film such as an In—Ga—Zn—O-based film, an In—Sn—Zn—O-based film, an In—Al—Zn—O-based film, a Sn—Ga—Zn—O-based film, an Al—Ga—Zn—O-based film, or a Sn—Al—Zn—O-based film; or a two-component metal oxide film such as an In—Zn—O-based film, a Sn—Zn—O-based film, an Al—Zn—O-based film, a Zn—Mg—O-based film, a Sn—Mg—O-based film, or an In—Mg—O-based film; an In—O-based film, a Sn—O-based film, or a Zn—O-based film can be used. Further, $SiO_2$ may be contained in the above oxide semiconductor layer.

As the oxide semiconductor, a thin film represented by $InMO_3 (ZnO)_m$ (m>0) can be used. Here, M represents one or more metal elements selected from Ga, Al, Mn, and Co. For example, M can be Ga, Ga and Al, Ga and Mn, Ga and Co, or the like. An oxide semiconductor whose composition formula is represented by $InMO_3 (ZnO)_m$ (m>0), which includes Ga as M, is referred to as the In—Ga—Zn—O-based oxide semiconductor described above, and a thin film of the In—Ga—Zn—O-based oxide semiconductor is also referred to as an In—Ga—Zn—O-based film.

In a thin film transistor including an oxide semiconductor layer, the temperature dependence of an on current can hardly be observed and an off current remains significantly low; thus, the thin film transistor including an oxide semiconductor layer is preferably used at high temperature.

The comparator circuit 103 is a circuit which selectively reads out image signals in successive frame periods stored in the memory circuit 102, compares the image signals in the successive frame periods in each pixel, and detects a difference thereof. Depending on whether a difference is detected, operations in the display control circuit 104 and the selection circuit 109 are determined. When a difference is detected in any of the pixels by comparing the image signals in the comparator circuit 103, a series of frame periods during which the difference is detected are judged as periods during which a moving image is displayed. On the other hand, when a difference is not detected in all the pixels by comparing the image signals in the comparator circuit 103, a series of frame periods during which no difference is detected are judged as periods during which a still image is displayed. In other words, depending on whether a difference is detected by the comparator circuit 103, whether the image signals in the successive frame periods are image signals for displaying a moving image or image signals for displaying a still image is determined. The difference obtained by the comparison may be set so as to be determined as a difference to be detected when it is over a predetermined level. The comparator circuit 103 may be set so as to judge detection of a difference in accordance with the absolute value of the difference regardless of the value of the difference.

Note that in this embodiment, whether a still image or a moving image is displayed is determined by detecting a difference between image signals in successive frame periods with the comparator circuit 103; however, a signal for determining whether a moving image or a still image is displayed may be supplied by externally supplying a signal for switching between a still image and a moving image.

Note that the moving image refers to an image which is recognized as a moving image with human eyes by rapid switch of a plurality of images which are time-divided into a plurality of frames. Specifically, by switching images at least 60 times (60 frames) per second, a moving image with less flicker is perceived by human eyes. In contrast, a still image refers to image signals which are the same in a series of frame periods, for example, in the n-th frame and (n+1)-th frame, unlike the moving image, although a plurality of images which are time-divided into a plurality of frames are switched at high speed.

The selection circuit 109 is a circuit for selecting image signals from the frame memory 108 where the image signals for displaying a moving image are stored and outputting the image signals to the display control circuit 104 when a difference is detected by calculation with the comparator circuit 103, that is, when images displayed in successive frame periods are moving images. Note that the selection circuit 109 does not output the image signals to the display control circuit 104 when a difference between the image signals is not detected by calculation with the comparator circuit 103, that is, when images displayed in successive frame periods are still images. When a still image is displayed, the selection circuit 109 does not output image signals from the frame memory 108 to the display control circuit 104, resulting in a reduction in power consumption. The selection circuit 109 may include a plurality of switches, for example, switches formed of transistors.

The display control circuit 104 is a circuit for controlling supply of an image signal to the driver circuit portion 105, which is selected by the selection circuit 109 when a difference is detected in the comparator circuit 103 and supply or stop of supply of a control signal for controlling the driver circuit portion 105, such as the high power supply potential Vdd, the low power supply potential Vss, the start pulse SP, or the clock signal CK, to the driver circuit portion 105. Specifically, when the comparator circuit 103 determines that a moving image is displayed, an image signal is read out from the memory circuit 102 through the selection circuit 109 and supplied to the driver circuit portion 105 from the display control circuit 104, and a control signal is supplied to the driver circuit portion 105 from the display control circuit 104. On the other hand, when the comparator circuit 103 determines that a still image is displayed, an image signal is not supplied to the display control circuit 104 from the selection circuit 109; therefore, the image signal is not supplied to the driver circuit portion 105 and supply of each control signal to the driver circuit portion 105 is stopped.

Note that the display control circuit 104 turns on the switching transistor 111 when a difference is detected by calculation with the comparator circuit 103, whereas the display control circuit 104 turns off the switching transistor 111 when a difference is not detected by calculation with the comparator circuit 103.

The supply of any signal refers to supply of a predetermined potential to a wiring. The stop of supply of any signal refers to stop of supply of a predetermined potential to the wiring, and connection to a wiring to which a predetermined fixed potential is supplied, for example, a wiring to which the low power supply potential Vss is supplied, or disconnection from a wiring to which a predetermined potential is supplied, which results in a floating state.

Note that in the case where an image is determined to be a still image, when the period during which the image is assumed to be the still image is short, stop of supply of the high power supply potential Vdd and the low power supply potential Vss among the control signals is not necessarily performed. This is because an increase in power consumption due to repetition of stop and start of supply of the high power supply potential Vdd and the low power supply potential Vss can be reduced, which is favorable.

It is desirable that the supply of the image signals and the control signals be stopped for a period during which the image signal can be held in each pixel in the pixel circuit portion 106. Therefore, the image signals and the control signals supplied from the display control circuit 104 in the previous period may be periodically supplied so that the image signals are supplied again after the holding period of image signals in each pixel. Note that an oxide semiconductor is used for the semiconductor layer of the thin film transistor included in the pixel circuit portion 106; thus, image signals can be held for a longer time.

For a shift register included in each of the gate line driver circuit 107A and the signal line driver circuit 107B of the driver circuit portion 105, a circuit for sequentially outputting pulses such as a clock signal, an inverted clock signal, and a start pulse from an output terminal of a first stage may be used.

Figure 11A:
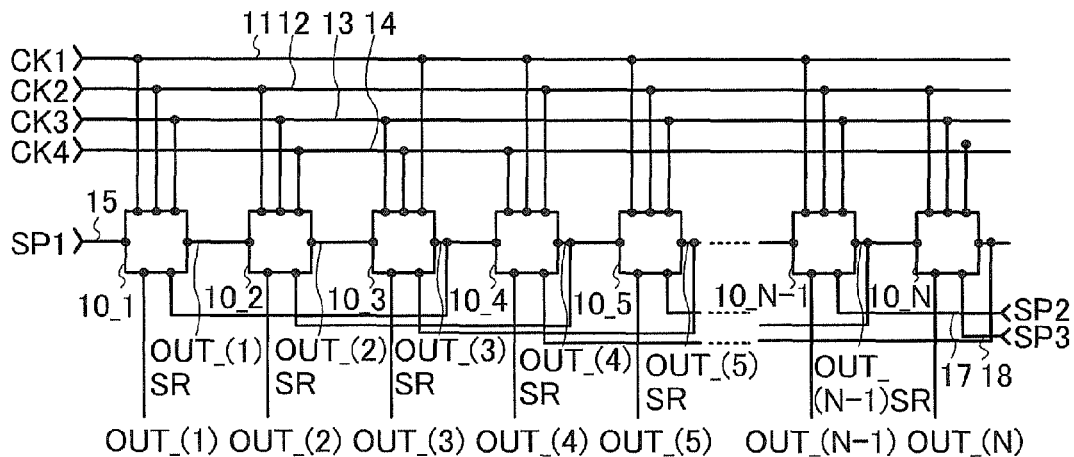
FIGS. 11A to 11C illustrate a liquid crystal display device according to an embodiment of the present invention.
Figure 11B:
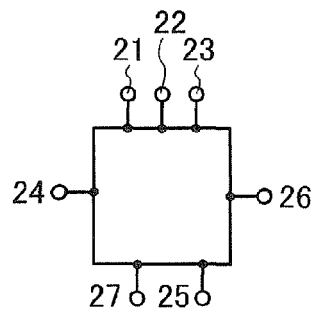
Figure 11C:
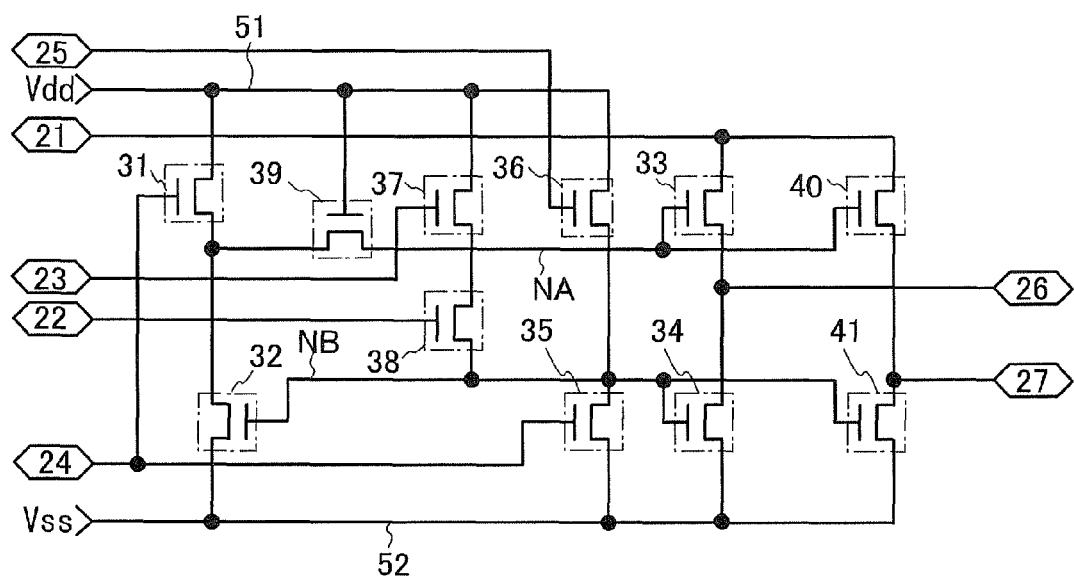

Here, FIGS. 11A to 11C illustrate an example of a shift register included in each of the gate line driver circuit 107A and the signal line driver circuit 107B.

The shift register in FIG. 11A includes a first to N-th pulse output circuits 10_1 to 10_N (N is a natural number greater than or equal to 3). In the shift register illustrated in FIG. 11A, a first clock signal CK1, a second clock signal CK2, a third clock signal CK3, and a fourth clock signal CK4 are supplied from a first wiring 11, a second wiring 12, a third wiring 13, and a fourth wiring 14, respectively, to the first to N-th pulse output circuits 10_1 to 10_N. A start pulse SP1 (a first start pulse) is input from a fifth wiring 15 to the first pulse output circuit 10_1. To the n-th pulse output circuit 10_n of the second or subsequent stage (n is a natural number greater than or equal to 2 and less than or equal to N), a signal from the pulse output circuit of the previous stage (such a signal is referred to as a previous-stage signal OUT(n−1)) (n is a natural number greater than or equal to 2) is input. To the first pulse output circuit 10_1, a signal from the third pulse output circuit 10_3 of the stage following the next stage is input. In a similar manner, to the n-th pulse output circuit 10_n of the second or subsequent stage, a signal from the (n+2)-th pulse output circuit 10_(n+2) of the stage following the next stage (such a signal is referred to as a subsequent-stage signal OUT(n+2)) is input. Thus, the pulse output circuits of the respective stages output first output signals (OUT(1)(SR) to OUT(N)(SR)) to be input to the pulse output circuits of the subsequent stages and/or the pulse output circuits of the stages before the preceding stages and second output signals (OUT(1) to OUT(N)) to be input to different circuits or the like. Note that the subsequent-stage signal OUT(n+2) is not input to the last two stages of the shift register as illustrated in FIG. 11A, and thus, a second start pulse SP2 and a third start pulse SP3 may be additionally input to the stage before the last stage and the last stage from a sixth wiring 17 and a seventh wiring 18, respectively, for example. Alternatively, a signal which is additionally generated in the shift register may be input. For example, an (N+1)-th pulse output circuit 10_ (N+1) and an (N+2)-th pulse output circuit 10_(N+2) which do not contribute to output of pulses to the pixel portion (such circuits are also referred to as dummy stages) may be provided so that signals corresponding to the second start pulse (SP2) and the third start pulse (SP3) are generated in the dummy stages.

Note that a first clock signal (CK1) to a fourth clock signal (CK4) are signals each of which alternates between an H-level and an L-level at regular intervals. Further, the first clock signal (CK1) to the fourth clock signal (CK4) are delayed by ¼ cycle sequentially. In this embodiment, driving of the pulse output circuit is controlled with the first to fourth clock signals (CK1) to (CK4). Note that the clock signal CK is also referred to as GCK or SCK in some cases depending on a driver circuit to which the clock signal is input; the clock signal is referred to as CK in the following description.

Note that when it is explicitly described that "A and B are connected," the case where A and B are electrically connected, the case where A and B are functionally connected, and the case where A and B are directly connected are included therein. Here, each of A and B corresponds to an object (e.g., a device, an element, a circuit, a wiring, an electrode, a terminal, a conductive film, or a layer). Thus, connection relation other than that shown in drawings and texts is also included without limitation to a predetermined connection relation, for example, the connection relation shown in the drawings and the texts.

Each of the first to N-th pulse output circuits 10_1 to 10_N is assumed to include the first input terminal 21, the second input terminal 22, the third input terminal 23, a fourth input terminal 24, a fifth input terminal 25, a first output terminal 26, and a second output terminal 27 (see FIG. 11B).

A first input terminal 21, a second input terminal 22, and a third input terminal 23 are electrically connected to any of the first to fourth wirings 11 to 14. For example, in the first pulse output circuit 10_1 in FIGS. 11A and 11B, the first input terminal 21 is connected to the first wiring 11; the second input terminal 22 is connected to the second wiring 12; and the third input terminal 23 is connected to the third wiring 13. In the second pulse output circuit 10_2, the first input terminal 21 is connected to the second wiring 12, the second input terminal 22 is connected to the third wiring 13, and the third input terminal 23 is connected to the fourth wiring 14.

In the first pulse output circuit 10_1 in FIGS. 11A and 11B, a start pulse is input to the fourth input terminal 24; a subsequent-stage signal OUT(3) is input to the fifth input terminal 25; the first output signal OUT(1)(SR) is output from the first output terminal 26; and the second output signal OUT(1) is output from the second output terminal 27.

Next, an example of a specific circuit configuration of the pulse output circuit will be described with reference to FIG. 11C.

In FIG. 11C, a first terminal of the first transistor 31 is connected to the power supply line 51, a second terminal of the first transistor 31 is connected to a first terminal of the ninth transistor 39, and a gate electrode of the first transistor 31 is connected to the fourth input terminal 24. A first terminal of the second transistor 32 is connected to the power supply line 52, a second terminal of the second transistor 32 is connected to the first terminal of the ninth transistor 39, and a gate electrode of the second transistor 32 is connected to a gate electrode of the fourth transistor 34. A first terminal of the third transistor 33 is connected to the first input terminal 21, and a second terminal of the third transistor 33 is connected to the first output terminal 26. A first terminal of the fourth transistor 34 is connected to the power supply line 52, and a second terminal of the fourth transistor 34 is connected to the first output terminal 26. A first terminal of the fifth transistor 35 is connected to the power supply line 52, a second terminal of the fifth transistor 35 is connected to the gate electrode of the second transistor 32 and the gate electrode of the fourth transistor 34, and a gate electrode of the fifth transistor 35 is connected to the fourth input terminal 24. A first terminal of the sixth transistor 36 is connected to the power supply line 51, a second terminal of the sixth transistor 36 is connected to the gate electrode of the second transistor 32 and the gate electrode of the fourth transistor 34, and a gate electrode of the sixth transistor 36 is connected to the fifth input terminal 25. A first terminal of the seventh transistor 37 is connected to the power supply line 51, a second terminal of the seventh transistor 37 is connected to a second terminal of the eighth transistor 38, and a gate electrode of the seventh transistor 37 is connected to the third input terminal 23. A first terminal of the eighth transistor 38 is connected to the gate electrode of the second transistor 32 and the gate electrode of the fourth transistor 34, and a gate electrode of the eighth transistor 38 is connected to the second input terminal 22. The first terminal of the ninth transistor 39 is connected to the second terminal of the first transistor 31 and the second terminal of the second transistor 32, a second terminal of the ninth transistor 39 is connected to a gate electrode of the third transistor 33 and a gate electrode of the tenth transistor 40, and a gate electrode of the ninth transistor 39 is connected to the power supply line 51. A first terminal of the tenth transistor 40 is connected to the first input terminal 21, a second terminal of the tenth transistor 40 is connected to the second output terminal 27, and the gate electrode of the tenth transistor 40 is connected to the second terminal of the ninth transistor 39. A first terminal of the eleventh transistor 41 is connected to the power supply line 52, a second terminal of the eleventh transistor 41 is connected to the second output terminal 27, and a gate electrode of the eleventh transistor 41 is connected to the gate electrode of the second transistor 32 and the gate electrode of the fourth transistor 34.

In FIG. 11C, a portion where the gate electrode of the third transistor 33, the gate electrode of the tenth transistor 40, and the second terminal of the ninth transistor 39 are connected is referred to as a node NA. Moreover, a portion where the gate electrode of the second transistor 32, the gate electrode of the fourth transistor 34, the second terminal of the fifth transistor 35, the second terminal of the sixth transistor 36, the first terminal of the eighth transistor 38, and the gate electrode of the eleventh transistor 41 are connected is referred to as a node NB.

In the case where the pulse output circuit in FIG. 11C is the first pulse output circuit 10_1, the first clock signal CK1 is input to the first input terminal 21; the second clock signal CK2 is input to the second input terminal 22; the third clock signal CK3 is input to the third input terminal 23; the start pulse SP is input to the fourth input terminal 24; a subsequent-stage signal OUT(3) is input to the fifth input terminal 25; the first output signal OUT(1)(SR) is output from the first output terminal 26; and the second output signal OUT(1) is output from the second output terminal 27.

Figure 12:
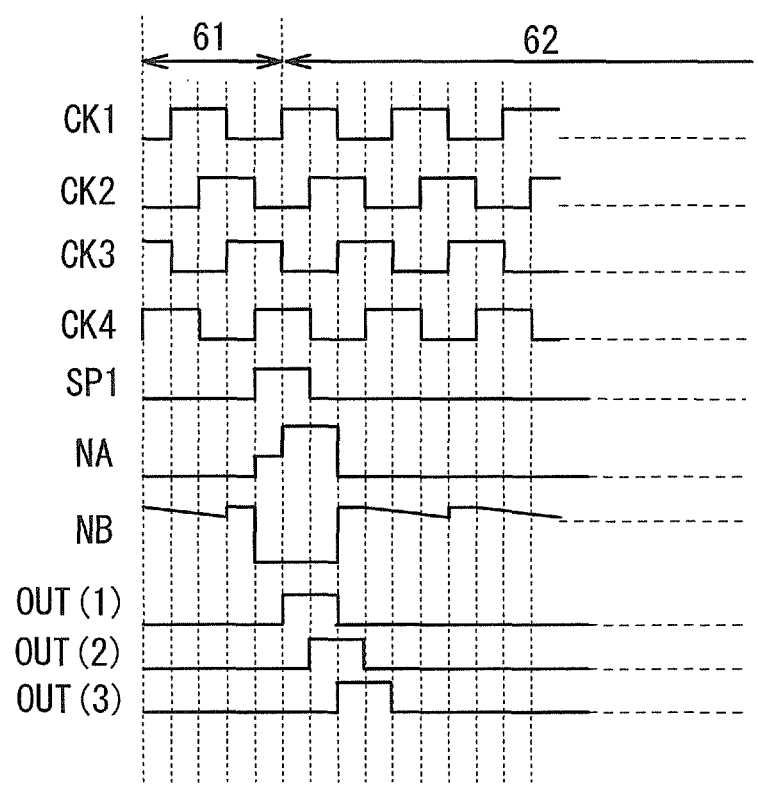
FIG. 12 illustrates a liquid crystal display device according to an embodiment of the present invention.

FIG. 12 illustrates a timing chart of a shift register including a plurality of pulse output circuits illustrated in FIG. 11C.

Note that when the shift register is the one of a gate line driver circuit, a period 61 in FIG. 12 corresponds to a vertical retrace period and a period 62 corresponds to a gate selection period.

Figure 2A:
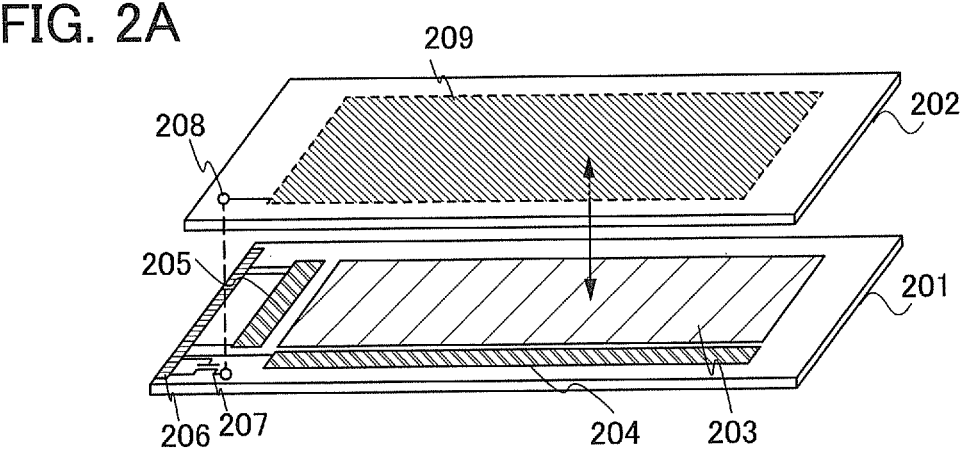
FIGS. 2A to 2C illustrate a liquid crystal display device according to an embodiment of the present invention.
Figure 2B:
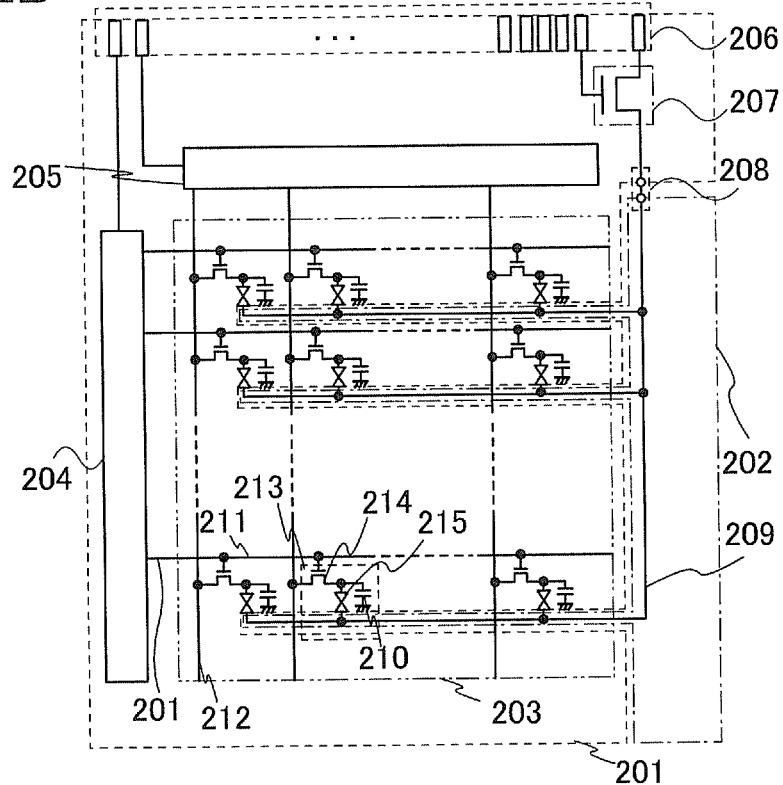
Figure 2C:
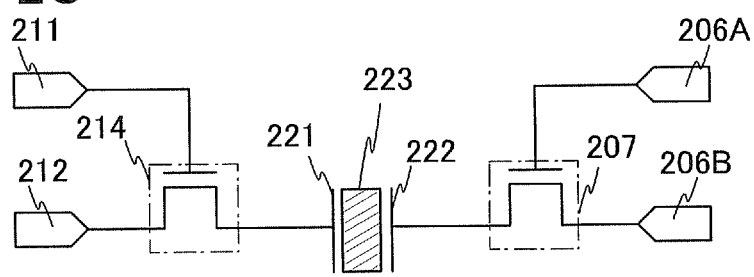

Next, advantages of providing the switching transistor 111 connected to the common electrode portion 110 in the display panel 101 illustrated in FIG. 1 will be described with reference to a schematic diagram, a circuit diagram, and the like in FIGS. 2A to 2C. In FIGS. 2A to 2C, a circuit such as a display control circuit (not illustrated) is provided outside the display panel, and a predetermined signal (the high power supply potential Vdd, the low power supply potential Vss, the start pulse SP, the clock signal CK, the image signal Data, the common potential Vcom, or the like) is input from the outside through a terminal portion.

A display panel in FIG. 2A includes a first substrate 201 and a second substrate 202. The first substrate 201 includes a pixel circuit portion 203, a gate line driver circuit 204, a signal line driver circuit 205, a terminal portion 206, and a switching transistor 207. The second substrate 202 includes a common connection portion 208 (also referred to as a common contact) and a common electrode 209 (also referred to as a counter electrode).

Note that the common electrode 209 is provided over the second substrate 202 with the common connection portion 208 therebetween in this embodiment; however, the common electrode 209 may be provided on the first substrate side.

It is necessary that the first substrate 201 and the second substrate 202 have light-transmitting properties and heat resistance high enough to withstand heat treatment to be performed later. As the first substrate 201 and the second substrate 202, any glass substrate used in the electronics industry (also called a non-alkali glass substrate) such as an aluminosilicate glass substrate, an aluminoborosilicate glass substrate, or a barium borosilicate glass substrate, a quartz substrate, a ceramic substrate, a plastic substrate, or the like can be used.

Figure 3:
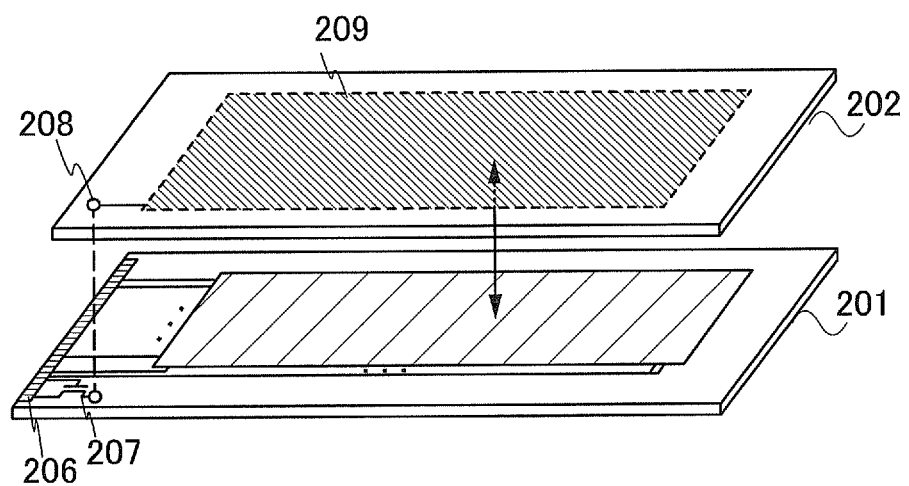
FIG. 3 illustrates a liquid crystal display device according to an embodiment of the present invention.

Note that the pixel circuit portion 203, the gate line driver circuit 204, the signal line driver circuit 205, and the switching transistor 207 in FIG. 2A may be formed using thin film transistors formed over the first substrate 201. Note that the gate line driver circuit 204 and the signal line driver circuit 205 are not necessarily formed using thin film transistors formed over the first substrate 201 and may be formed over another substrate outside the first substrate 201, or the like as illustrated in FIG. 3.

Note that in the pixel circuit portion 203, a plurality of gate lines and a plurality of signal lines are extended from the gate line driver circuit 204 and the signal line driver circuit 205, and a plurality of pixels are provided so that the pixels are surrounded by the gate lines and the signal lines.

A signal controlled by the display control circuit 104 in FIG. 1 is supplied from the terminal portion 206. That is, a predetermined signal (the high power supply potential Vdd, the low power supply potential Vss, the start pulse SP, the clock signal CK, the image signal Data, the common potential Vcom, or the like) for outputting a pulse signal for performing display in the pixel circuit portion 203 is supplied from the outside through the terminal portion 206.

The common connection portion 208 is provided for achieving electrical connection between the second terminal of the switching transistor 207 in the first substrate 201 and the common electrode 209 in the second substrate 202. The common potential is supplied from the terminal portion 206 to the common electrode 209 through the switching transistor 207 and the common connection portion 208. As a specific example of the common connection portion 208, a conductive particle in which an insulating sphere is coated with a thin metal film may be used, so that electrical connection is made. Note that two or more common connection portions 208 may be provided between the first substrate 201 and the second substrate 202.

It is preferable that the common electrode 209 overlap with a pixel electrode included in the pixel circuit portion 203. Further, the common electrode 209 and the pixel electrode included in the pixel circuit portion 203 may have a variety of opening patterns.

FIG. 2B is a circuit diagram in which the structure of the pixel circuit portion 203 in the schematic view of the display panel of FIG. 2A is particularly illustrated in detail.

The liquid crystal display device illustrated in FIG. 2B includes the first substrate 201 and the second substrate 202 as in FIG. 2A. The first substrate 201 includes the pixel circuit portion 203, the gate line driver circuit 204, the signal line driver circuit 205, the terminal portion 206, and the switching transistor 207. The second substrate 202 includes the common connection portion 208 and the common electrode 209.

In FIG. 2B, in the pixel circuit portion 203, a plurality of gate lines 211 and a plurality of signal lines 212 are arranged in matrix, and pixels 213 each including a thin film transistor (hereinafter referred to as a pixel transistor 214); a liquid crystal element 215 in which a liquid crystal is interposed between a first electrode and a second electrode; and a capacitor 210 are provided. In FIG. 2B, one of a source terminal and a drain terminal of the pixel transistor 214 is referred to as a first terminal, and the other of the source terminal and the drain terminal is referred to as a second terminal. The first terminal is connected to the signal line 212, a gate terminal is connected to the gate line 211, and the second terminal is connected to the first electrode of the liquid crystal element 215. In FIG. 2B, one of electrodes of the capacitor 210 is connected to the first electrode of the liquid crystal element 215, and the other electrode is connected to another wiring. Note that the first electrode of the liquid crystal element 215 corresponds to the pixel electrode, and the second electrode of the liquid crystal element 215 corresponds to the common electrode 209.

Note that although the pixel 213 is provided with the capacitor 210 in FIG. 2B, the capacitor is not necessarily provided.

Next, FIG. 2C is a circuit diagram of one pixel of pixels including pixel electrodes. The circuit diagram in FIG. 2C focuses on the pixel transistor 214 and the switching transistor 207. A gate terminal of the pixel transistor 214 is connected to the gate line 211, the first terminal of the pixel transistor 214 is connected to the signal line 212, and the second terminal of the pixel transistor 214 is connected to the pixel electrode 221. The gate terminal of the switching transistor 207 is connected to a terminal 206A of the terminal portion 206, the first terminal of the switching transistor 207 is connected to a terminal 206B of the terminal portion 206, and the second terminal of the switching transistor 207 is electrically connected to a common electrode 222 through the common connection portion 208. Note that a liquid crystal 223 is interposed between the pixel electrode 221 and the common electrode 222. The pixel electrode 221, the common electrode 222, and the liquid crystal 223 may be collectively referred to as a liquid crystal element.

Figure 4:
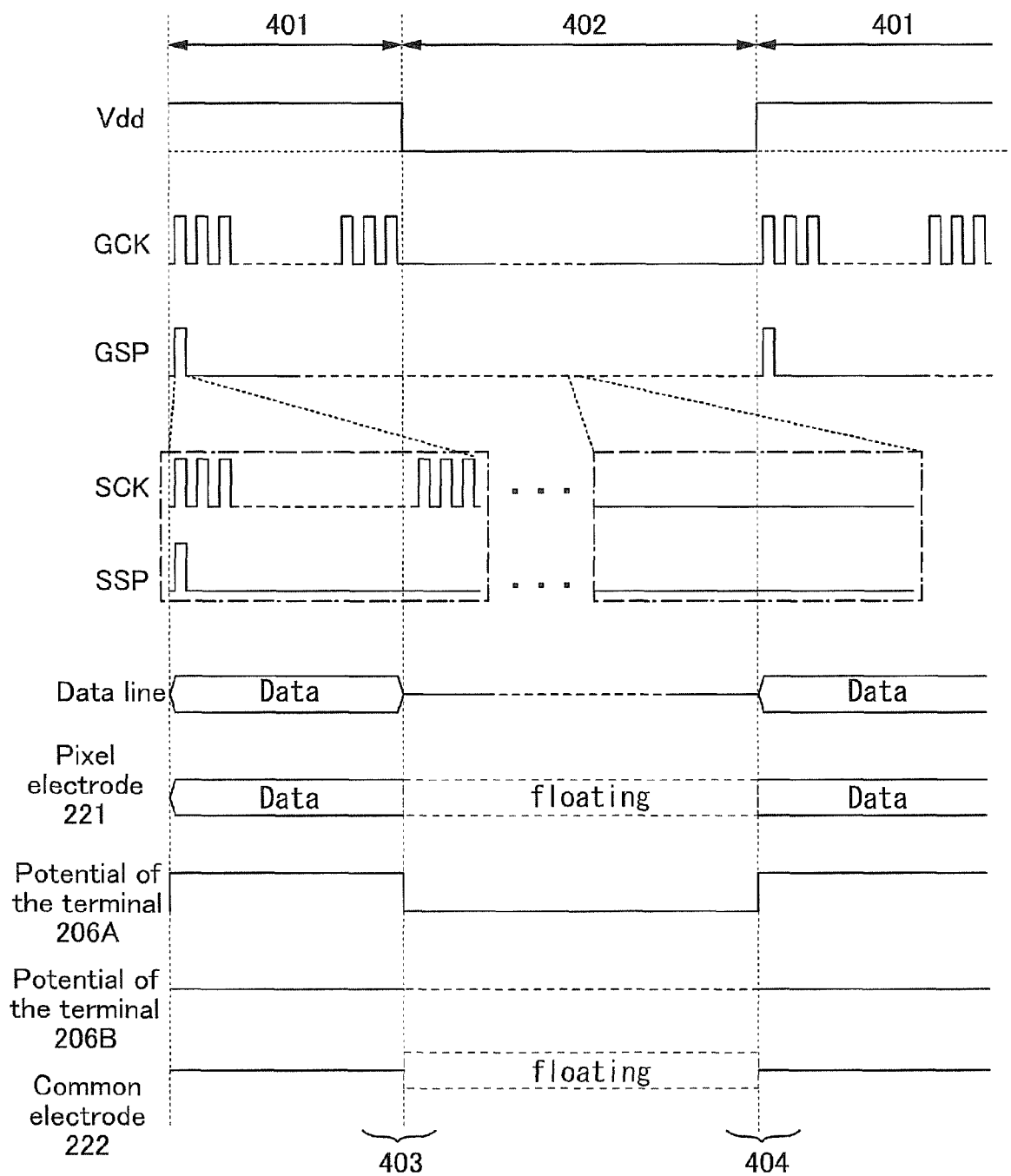
FIG. 4 illustrates a liquid crystal display device according to an embodiment of the present invention.

FIG. 4 is a timing chart illustrating the state of signals supplied to the terminals, the gate line driver circuit 204, and the signal line driver circuit 205 in the circuit diagram in FIG. 2C. Note that as an example of the timing chart, a period 401 in FIG. 4 corresponds to a moving image writing period and a period 402 in FIG. 4 corresponds to a still image display period. The period in FIG. 4 may be determined to be either the moving image writing period or the still image display period in accordance with the result of the determination of whether an image is a moving image or a still image. In FIG. 4, GCK refers to a clock signal supplied to the gate line driver circuit 204; GSP refers to a start pulse supplied to the gate line driver circuit 204; SCK refers to a clock signal supplied to the signal line driver circuit 205; and SSP refers to a start pulse supplied to the signal line driver circuit 205. In addition, FIG. 4 also shows a potential of the signal line 212, a potential of the pixel electrode 221, a potential of the terminal 206A, a potential of the terminal 206B, and a potential of the common electrode 222. For the structure of a shift register in a driver circuit portion to which GCK which is a clock signal, GSP which is a start pulse, SCK which is a clock signal, and GSP which is a start pulse are supplied, the structure of the circuit described in FIGS. 11A to 11C and FIG. 12 may be used practically.

Note that the period 401 corresponds to a period during which image signals for displaying a moving image are written. Further, the period 402 corresponds to a period during which a still image is displayed. Thus, in the period 401, operation is performed so that the image signals and the common potential are supplied to the pixels in the pixel circuit portion 203 and the common electrode. On the other hand, in the period 402, the supply of the image signals and the common potential to the pixels in the pixel circuit portion 203 and the common electrode is stopped. Note that each signal is supplied in the period 402 so that operation of the driver circuit portion is stopped in FIG. 4; however, it is preferable to prevent deterioration of a still image by writing image signals periodically in accordance with the length of the period 402.

In the period 401, a clock signal GCK is supplied at all times as illustrated in FIG. 4; a start pulse GSP is supplied in accordance with a vertical synchronizing frequency as illustrated in FIG. 4; a clock signal SCK is supplied at all times as illustrated in FIG. 4; and a start pulse SSP is supplied in accordance with one gate selection period as illustrated in FIG. 4. In the period 401, an image signal Data, which is to be supplied to the pixel of each row, is supplied to the signal line 212, and the potential of the signal line 212 is supplied to the pixel electrode 221 in the pixel in accordance with the potential of the gate line 211, as illustrated in FIG. 4. Further, from the display control circuit 104, the terminal 206A corresponding to the gate terminal of the switching transistor 207 is given a potential at which the switching transistor 207 is turned on, so that the common potential, which is the potential of the terminal 206B, is supplied to the common electrode 222, as illustrated in FIG. 1 and FIGS. 2A to 2C.

In the period 402, the supply of both the clock signal GCK and the start pulse GSP is stopped as illustrated in FIG. 4; the supply of both the clock signal SCK and the start pulse SSP is also stopped as illustrated in FIG. 4; and the supply of the image signal Data, which has been supplied to the signal line 212, is also stopped as illustrated in FIG. 4. In the period 402, the supply of both the clock signal GCK and the start pulse GSP is stopped as illustrated in FIG. 4, so that the pixel transistor 214 is turned off, the supply of the image signal Data is stopped, and the pixel electrode 221 is brought into a floating state. Furthermore, the terminal 206A corresponding to the gate terminal of the switching transistor 207 is given a potential at which the switching transistor 207 is turned off; thus, the supply of the common potential, which is the potential of the terminal 206B, is stopped. Consequently, the common electrode 222 is brought into a floating state.

That is, in the period 402, both electrodes of the liquid crystal 223, i.e., the pixel electrode 221 and the common electrode 222, can be brought into a floating state; thus, a still image can be displayed without supply of another potential. The supply of a clock signal and a start pulse to the gate line driver circuit 204 and the signal line driver circuit 205 is stopped, whereby low power consumption can be achieved. With the use of a thin film transistor including an oxide semiconductor layer, the off current can be reduced when two terminals of a liquid crystal element are in a non-conduction state. The pixel transistor 214 and the switching transistor 207 each of which is formed using such a thin film transistor can reduce a current which flows through the liquid crystal element.

Figure 5A:
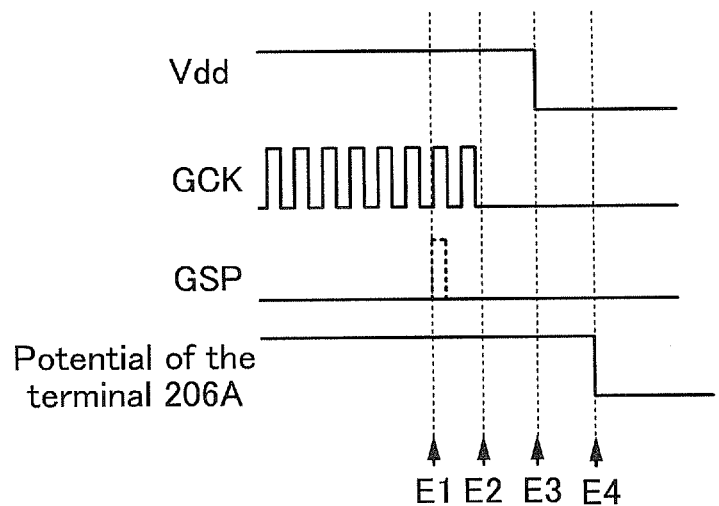
FIGS. 5A and 5B each illustrate a liquid crystal display device according to an embodiment of the present invention.
Figure 5B:
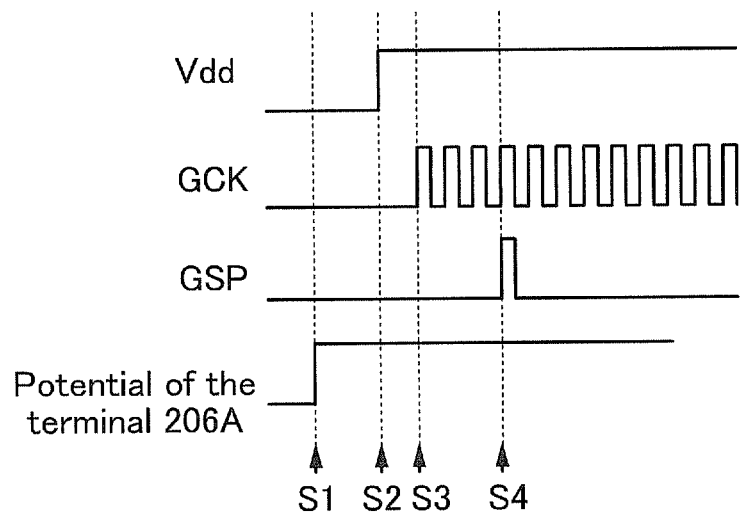

Next, FIGS. 5A and 5B show timing charts of the high power supply potential Vdd, the clock signal (here, GCK), the start pulse signal (here, GSP), and the potential of the terminal 206A, which are signals from the display control circuit 104, in a period during which the period 401 is switched to the period 402 in the timing chart of FIG. 4, namely, a period during which a moving image is switched to a still image (a period 403 in FIG. 4), and a period during which the period 402 is switched to the period 401, namely, a period during which a still image is switched to a moving image (a period 404 in FIG. 4).

As illustrated in FIG. 5A, the display control circuit 104 stops the supply of the start pulse GSP in a period during which a moving image is switched to a still image (E1 in FIG. 5A, a first step). Next, supply of a plurality of clock signals GCK is stopped after pulse output reaches the last stage of the shift register (E2 in FIG. 5A, a second step). Then, the high power supply potential Vdd of a power supply voltage is changed to the low power supply potential Vss (E3 in FIG. 5A, a third step). After that, the potential of the terminal 206A is changed to a potential at which the switching transistor 111 is turned off (E4 in FIG. 5A, a fourth step).

Through the above steps, the supply of signals to the driver circuit portion 105 can be stopped without malfunction of the driver circuit portion 105. In the case of still image display, a voltage applied to a liquid crystal is held by holding charge in a pixel electrode; therefore, by operating the driver circuit portion 105 without generating noise due to malfunction, a method for driving a liquid crystal display device capable of displaying a still image which is not deteriorated so much can be provided.

As illustrated in FIG. 5B, with the display control circuit 104, the potential of the terminal 206A is changed to a potential at which the switching transistor 111 is turned on in a period during which a still image is switched to a moving image (S1 in FIG. 5B, a first step). Then, a power supply voltage is changed from the low power supply potential Vss to the high power supply potential Vdd (S2 in FIG. 5B, a second step). After that, a plurality of clock signals GCK are supplied (S3 in FIG. 5B, a third step). Next, the start pulse signal GSP is supplied (S4 in FIG. 5B, a fourth step).

Through the above steps, the supply of the signals to the driver circuit portion 105 can be restarted without malfunction of the driver circuit portion 105. Potentials of the wirings are sequentially changed back to those at the time of displaying a moving image, whereby the driver circuit portion can be driven without malfunction.

Figure 6:
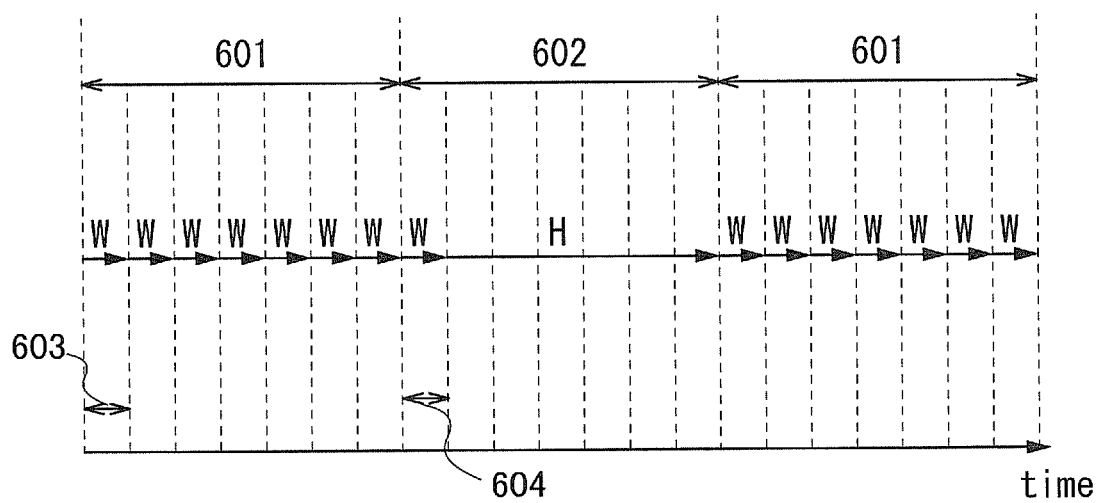
FIG. 6 illustrates a liquid crystal display device according to an embodiment of the present invention.

FIG. 6 is a chart schematically showing, for example, in frame periods, the frequency of writing of image signals in a period 601 during which a moving image is displayed and a period 602 during which a still image is displayed, where the horizontal axis shows time. In FIG. 6, "W" indicates a period during which an image signal is written, and "H" indicates a period during which the image signal is held. In addition, a period 603 is one frame period in FIG. 6; however, the period 603 may be a different period.

As shown in FIG. 6, in the structure of the liquid crystal display device according to this embodiment, in the case where a difference is not detected between image signals of successive frames by a comparator circuit, that is, in the period 602 during which a still image is displayed, an image signal to be supplied to a pixel is written only in a period during which switching of image signals is performed (the period 604 in FIG. 6). The other periods in the period 602 are periods during which the image signal supplied in the period 604 is held.

As described above, in the structure of this embodiment, in the period during which a still image is displayed, the frequency of operations such as writing of an image signal can be reduced. When seeing an image formed by writing image signals a plurality of times, the human eyes recognize images switched a plurality of times, which might lead to eyestrain. With a structure where the frequency of writing of image signals is reduced as described in this embodiment, eyestrain can be alleviated.

Further, thin film transistors including oxide semiconductors are provided in pixels in this embodiment, so that the off current of the thin film transistors can be reduced. Therefore, it is possible to provide a liquid crystal display device in which a voltage can be held in a storage capacitor for a longer time and power consumption at the time when a still image is displayed can be reduced.

This embodiment can be implemented in appropriate combination with any of the structures described in the other embodiments.

(Embodiment 2)

A structure of a display panel in the liquid crystal display device in Embodiment 1 will be described with reference to a specific top view and specific cross-sectional views in FIGS. 7A to 7C.

Figure 7A:
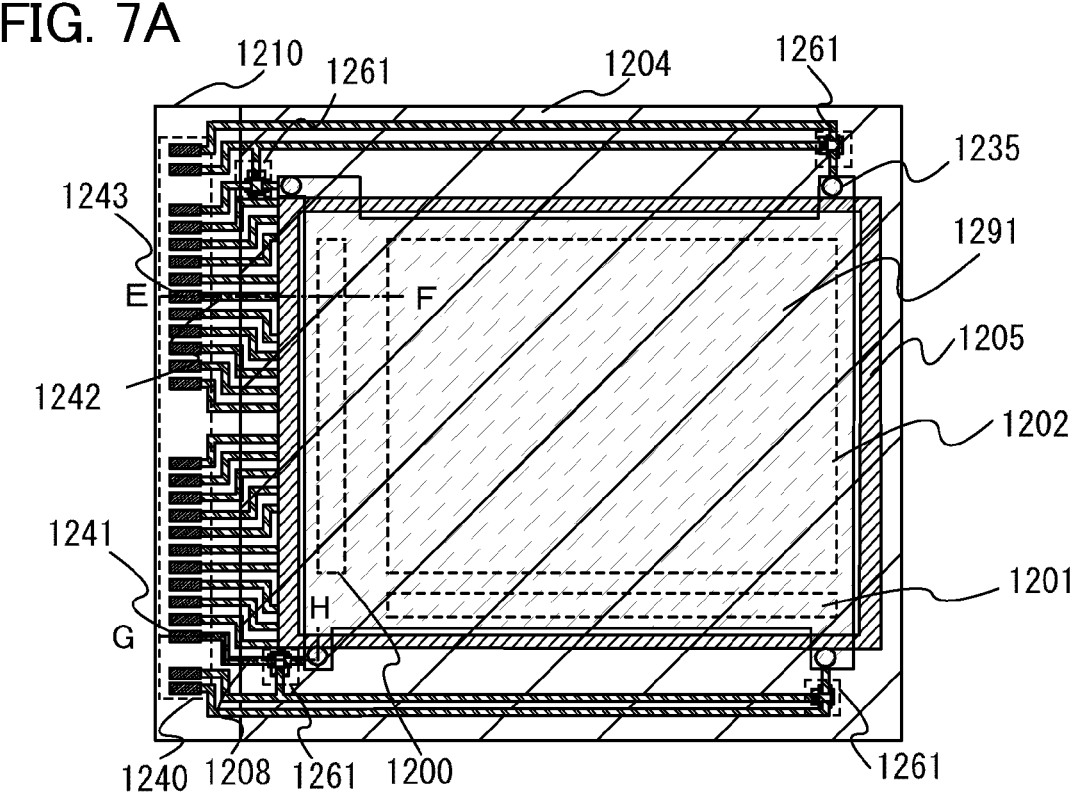
FIGS. 7A to 7C illustrate a liquid crystal display device according to an embodiment of the present invention.

FIG. 7A is a top view of a display panel. FIG. 7A is a top view of the display panel in which an FPC has not been attached to a first substrate 1210. FIG. 7B is a cross-sectional view taken along line G-H of FIG. 7A, which illustrates a connection region of a conductive particle and a connection wiring. FIG. 7C is a cross-sectional view taken along line E-F of FIG. 7A, which illustrates a connection region of a pixel circuit and a connection wiring.

Figure 7B:
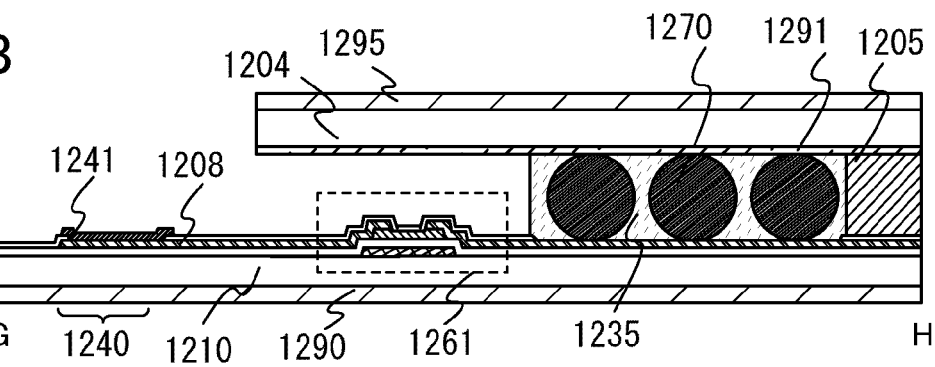
Figure 7C:
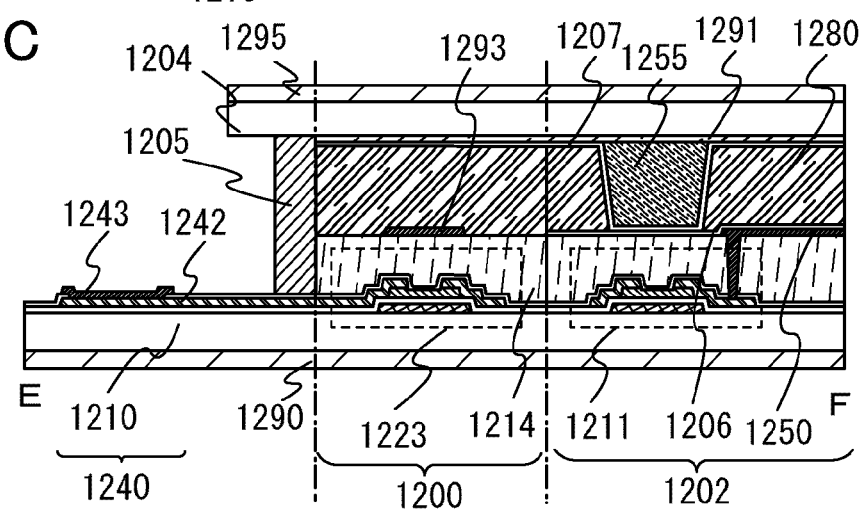

In FIGS. 7A to 7C, the first substrate 1210 which is provided with pixel electrodes and serves as an active matrix substrate and a second substrate 1204 provided with a common electrode 1291 are attached to each other with a sealing material 1205, and the interior space surrounded by the sealing material 1205 is filled with liquid crystal 1280. A signal line driver circuit 1200, a gate line driver circuit 1201, and a pixel circuit 1202 in which the pixel electrodes are formed in matrix are formed over the first substrate 1210.

As the liquid crystal 1280, thermotropic liquid crystal, low-molecular liquid crystal, high-molecular liquid crystal, polymer-dispersed liquid crystal, ferroelectric liquid crystal, anti-ferroelectric liquid crystal, or the like is used. Such a liquid crystal material exhibits a cholesteric phase, a smectic phase, a cubic phase, a chiral nematic phase, an isotropic phase, or the like depending on conditions.

In FIG. 7B, the common electrode 1291 is electrically connected to a terminal portion 1240 through a connection wiring 1208 extended from the terminal portion 1240, a switching transistor 1261, and a resin layer 1235 which is provided with conductive particles interposed between the pair of substrates. The number of the connections is four in FIG. 7A as an example and may be at least one.

FIG. 7C illustrates the signal line driver circuit 1200 provided with a circuit including a driver circuit thin film transistor 1223 over the first substrate 1210, as a driver circuit portion. Further, the gate line driver circuit 1201 including a driver circuit thin film transistor is provided over the first substrate, as a driver circuit portion.

In FIG. 7C, the pixel circuit 1202 includes a pixel transistor 1211. Further, a pixel electrode 1250 connected to the pixel transistor 1211 is formed over and in an insulating layer 1214.

In FIGS. 7A to 7C, the pixel transistor 1211, the driver circuit thin film transistor 1223, and the switching transistor 1261 are each formed using an oxide semiconductor layer, a gate insulating layer, and a gate electrode layer.

The above is the description of one example of the structure of the transistor. However, the structure of the transistor is not limited to the above structure; the transistor can have any of various structures. For example, the transistor may have a multi-gate structure including two or more gate electrodes. Alternatively, the transistor can have the structure where a gate electrode is provided above a channel region, the structure where a gate electrode is provided below a channel region, a staggered structure, an inverted staggered structure, or the structure where a channel region is divided into a plurality of regions. In the case of an inverted staggered structure, a channel protective structure, a channel etched structure, or the like can be employed.

A conductive layer 1293 overlapping with the gate electrode layer and the oxide semiconductor layer with the insulating layer 1214 interposed therebetween is provided over the driver circuit thin film transistor 1223 in FIG. 7C.

In the driver circuit thin film transistor 1223, the oxide semiconductor layer is interposed between the gate electrode layer and the conductive layer 1293. With such a structure, variation in threshold voltage of the driver circuit thin film transistor 1223 can be reduced, so that a display panel provided with the driver circuit thin film transistor 1223, which has stable electric characteristics, can be provided. The conductive layer 1293 may be at the same potential as the gate electrode layer or may be at a floating potential or a fixed potential such as a GND potential or 0 V. By supplying an appropriate potential to the conductive layer 1293, the threshold voltage of the driver circuit thin film transistor 1223 can be controlled.

The switching transistor 1261 in FIG. 7B is electrically connected to the common electrode 1291 through a conductive particle 1270 in the resin layer 1235.

Although the switching transistor 1261 is on an outer side than the sealing material 1205 in FIG. 7A, the switching transistor may be on an inner side than the sealing material 1205. For example, the switching transistor may be provided in a region where the signal line driver circuit 1200 is formed. The switching transistor 1261 on an inner side than the sealing material 1205 can be protected against an impact from an external source, and the like. Thus, the lifetime of the switching transistor 1261 can be made long.

In FIGS. 7A to 7C, as each of the first substrate 1210 and the second substrate 1204, any glass substrate used in the electronics industry (also called a non-alkali glass substrate) such as an aluminosilicate glass substrate, an aluminoborosilicate glass substrate, or a barium borosilicate glass substrate, a quartz substrate, a ceramic substrate, a plastic substrate, or the like can be used as appropriate. With the use of a flexible plastic substrate as each of the first substrate 1210 and the second substrate 1204, a flexible display device can be manufactured.

In FIGS. 7A to 7C, the sealing material 1205 is applied to the first substrate or the second substrate by a screen printing method, or with an ink-jet apparatus or a dispensing apparatus. As the sealing material 1205, typically, a material containing a visible light curable resin, an ultraviolet curable resin, or a thermosetting resin can be used. For example, an epoxy resin such as a liquid bisphenol-A resin, a solid bisphenol-A resin, a bromine-containing epoxy resin, a bisphenol-F resin, a bisphenol-AD resin, a phenol resin, a cresol resin, a novolac resin, a cycloaliphatic epoxy resin, an Epi-Bis type epoxy resin, a glycidyl ester resin, a glycidyl amine resin, a heterocyclic epoxy resin, or a modified epoxy resin can be used. As the sealing material 1205, a material having a viscosity of 40 Pa·s to 400 Pa·s is used. Further, the sealing material 1205 may contain a filler (1 μm to 24 μm in diameter). Note that it is preferable to select as the sealing material, a sealing material which is insoluble in liquid crystal which is in contact with the sealing material later.

As the conductive particle 1270, a conductive particle in which an insulating sphere is covered with a thin metal film can be used. The insulating sphere is formed using silica glass, a hard resin, or the like. The thin metal film can be formed using a single layer or a stack of any of gold, silver, palladium, nickel, ITO, and IZO. For example, as the thin metal film, a thin gold film, a stack of a thin nickel film and a thin gold film, or the like can be used. With the use of the conductive particle in which the insulating sphere is contained at the center, elasticity can be increased so that destruction due to pressure from an external source can be suppressed.

The kinds of the pixel electrode 1250 differ between a transmissive display panel and a reflective display panel. In the case of a transmissive display panel, the pixel electrode 1250 is formed using a light-transmitting material. As examples of the light-transmitting material, indium tin oxide (ITO), zinc oxide (ZnO), indium zinc oxide (IZO), gallium-doped zinc oxide (GZO), and the like can be given.

Alternatively, the pixel electrode 1250 may be formed using a conductive composition containing a conductive high polymer. The pixel electrode formed using the conductive composition preferably has a sheet resistance of 10000 Ω/square or less and a transmittance of to 70% or higher at a wavelength of 550 nm. Further, the resistivity of the conductive high polymer contained in the conductive composition is preferably 0.1 Ω·cm or less.

As the conductive high polymer, a so-called π-electron conjugated conductive polymer can be used. For example, polyaniline or a derivative thereof, polypyrrole or a derivative thereof, polythiophene or a derivative thereof, a copolymer of two or more kinds of them, and the like can be given.

On the other hand, in the case of a reflective display panel, a metal electrode having high reflectivity is used as the pixel electrode. Specifically, aluminum, silver, or the like is used. Further, the reflectivity is increased by making the surface of the pixel electrode rough. Therefore, a base film of the pixel electrode may be made rough.

In the case of a transflective display panel, a transmissive material and a reflective material are used for the pixel electrode.

Further, a terminal portion 1240 is formed in an end portion of the first substrate 1210. In the terminal portion 1240, a connection terminal 1241 is formed over the connection wiring 1208.

FIG. 7B is a cross-sectional view of a region where the conductive particle 1270 and the connection terminal are connected to each other. The connection wiring 1208 and the switching transistor 1261 are formed over the first substrate 1210. The connection terminal 1241 formed at the same time as the pixel electrode 1250 is formed over the connection wiring 1208. The connection terminal 1241 is electrically connected to the common electrode 1291 through the connection wiring 1208, the switching transistor 1261, and the conductive particle 1270. Further, the connection terminal 1241 is connected to an FPC (not illustrated). Note that in FIG. 7B, the conductive particle 1270 is fixed by the resin layer 1235 (not illustrated). The resin layer 1235 can be formed using an organic resin material like that used for the sealing material 1205.

FIG. 7C is a cross-sectional view of a region where the pixel electrode and the connection terminal are connected to each other. A connection wiring 1242 formed at the same time as source and drain electrode layers of the thin film transistor is formed over the first substrate 1210. A connection terminal 1243 formed at the same time as the pixel electrode 1250 is formed over the connection wiring 1242. The connection terminal 1243 is electrically connected to the pixel electrode 1250 through the connection wiring 1242. Note that, since an active matrix display panel is used in this embodiment, the pixel electrode 1250 and the connection wiring 1242 are not directly connected but are connected through the pixel transistor 1211 or the signal line driver circuit 1200.

An alignment film 1206 is provided over the pixel electrode 1250, and rubbing treatment is performed thereon. The alignment film 1206 and rubbing treatment are not necessarily required, which depends on the mode of liquid crystal.

For the second substrate 1204 which serves as a counter substrate, a black matrix may be provided at a position overlapping with the signal line driver circuit 1200, and a color filter, a protective layer, and the like may be provided at a position overlapping with the pixel circuit 1202. The common electrode 1291 is formed, and an alignment film 1207 is provided on the common electrode 1291, and rubbing is performed thereon. Similarly to the case of the first substrate 1210, as for the second substrate 1204, an alignment film and rubbing treatment are not necessarily required, which depends on the mode of liquid crystal.

The second substrate 1204 provided with the common electrode 1291 or the first substrate 1210 provided with the pixel electrode 1250 is provided with a pillar spacer 1255. The pillar spacer 1255 is provided to keep a distance between the first substrate 1210 and the second substrate 1204. In this embodiment, an example is described in which the pillar spacer 1255 is provided on the second substrate 1204 side. The pillar spacer is also called a photolitho spacer, a post spacer, a scallop spacer, or a column spacer. Alternatively, a spherical spacer may be used. In this embodiment, a pillar spacer is used. As for a method for forming the pillar spacer 1255, an organic insulating material such as photosensitive acrylic is applied to an entire surface of the substrate by a spin coating method, and a photolithography process is performed, so that photosensitive acrylic which remains over the substrate serves as the spacer. With this method, a place where a spacer is desired to be disposed can be exposed in accordance with a mask pattern at the time of exposure; therefore, by disposing the pillar spacer at a portion where the liquid crystal does not drive, the distance between the upper and lower substrates is maintained and in addition, light of the liquid crystal can be prevented from leaking. Further, the pillar spacer 1255 can be formed by discharging a composition containing an organic insulating material by an ink-jet method and baking it.

The space around the conductive particle 1270 may be filled with a conductive polymer. As typical examples of the conductive polymer, conductive polyaniline, conductive polypyrrole, conductive polythiophene, a complex of poly-ethylenedioxythiophene (PEDOT) and poly(styrenesulfonic acid) (PSS), and the like can be given. Further, any of the afore-mentioned examples of the conductive polymer which can be used for the pixel electrode 1250 can be used as appropriate. The conductive polymer is formed by applying the conductive polymer with an ink-jet apparatus, a dispensing apparatus, or the like. When the conductive polymer is in contact with the common electrode or the connection wiring, the conductive particle 1270 and the conductive polymer are in contact with the common electrode and the connection wiring, so that connection resistance between the common electrode and the connection wiring can be reduced.

Note that the connection wiring 1208 and the common electrode 1291 formed on the second substrate 1204 are electrically connected to each other through the conductive particle 1270.

The sealing material 1205 and the conductive particle 1270 are discharged over the first substrate 1210 or the second substrate 1204, and then liquid crystal is discharged in a space surrounded by the sealing material 1205. After that, the first substrate 1210 and the second substrate 1204 are attached to each other in reduced pressure, UV light irradiation is performed to cure the sealing material 1205, and then heating is performed to further harden the sealing material 1205, so that the first substrate 1210 and the second substrate 1204 are firmly attached to each other. In addition, the orientation of the liquid crystal is made uniform by the heating.

Consequently, the first substrate 1210 and the second substrate 1204 can be attached to each other.

Then, the first substrate 1210 and the second substrate 1204 are cut to have a panel shape. Furthermore, in order to improve the contrast, a first polarizing plate 1290 and a second polarizing plate 1295 are provided outside the first substrate 1210 and the second substrate 1204, respectively. Note that the first polarizing plate 1290 is not necessarily provided in the case of a reflective display device.

Although not illustrated in this embodiment, a black matrix (a light-blocking layer), an optical member (an optical substrate) such as a polarizing member, a retardation member, or an anti-reflection member, and the like are provided as appropriate. For example, circular polarization may be obtained using a polarizing substrate and a retardation substrate. In addition, a backlight, a side light, or the like may be used as a light source.

In an active matrix display panel, display patterns are formed on a screen by driving pixel electrodes that are arranged in matrix. Specifically, when a voltage is applied between a selected pixel electrode and a common electrode that corresponds to the selected pixel electrode, optical modulation of a liquid crystal layer disposed between the pixel electrode and the common electrode is performed, and this optical modulation is recognized as a display pattern by observers.

In the structure of a display panel including a thin film transistor including an oxide semiconductor layer, which is described above, low power consumption can be achieved in displaying a still image as in Embodiment 1.

This embodiment can be implemented in appropriate combination with any of the structures described in the other embodiments.

(Embodiment 3)

In this embodiment, the liquid crystal display device described in the above embodiment, which additionally has a touch panel function, will be described with reference to FIGS. 8A and 8B.

Figure 8A:
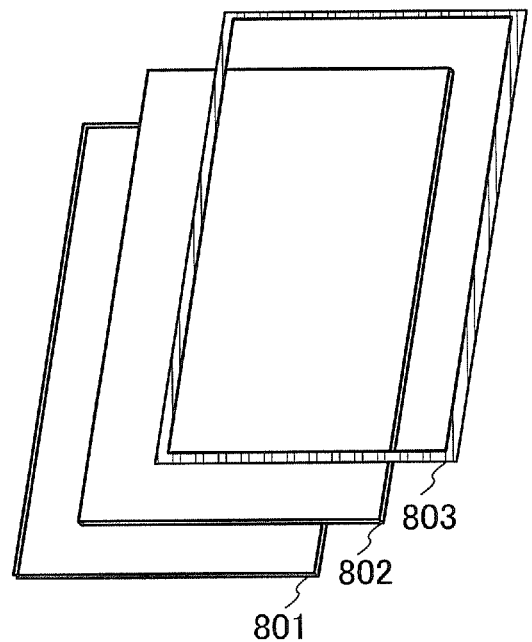
FIGS. 8A and 8B each illustrate a liquid crystal display device according to an embodiment of the present invention.

FIG. 8A is a schematic view of the liquid crystal display device according to this embodiment. FIG. 8A illustrates a structure where a liquid crystal display panel 801 which is the liquid crystal display device according to the above embodiment and a touch panel unit 802 are provided so as to overlap with each other and attached to each other in a housing (case) 803. For the touch panel unit 802, a resistive type, a surface capacitive type, a projected capacitive type, or the like can be used as appropriate.

As illustrated in FIG. 8A, the liquid crystal display panel 801 and the touch panel unit 802 are separately fabricated and overlapped with each other, whereby the cost for manufacture of the liquid crystal display device additionally having a touch panel function can be reduced.

Figure 8B:
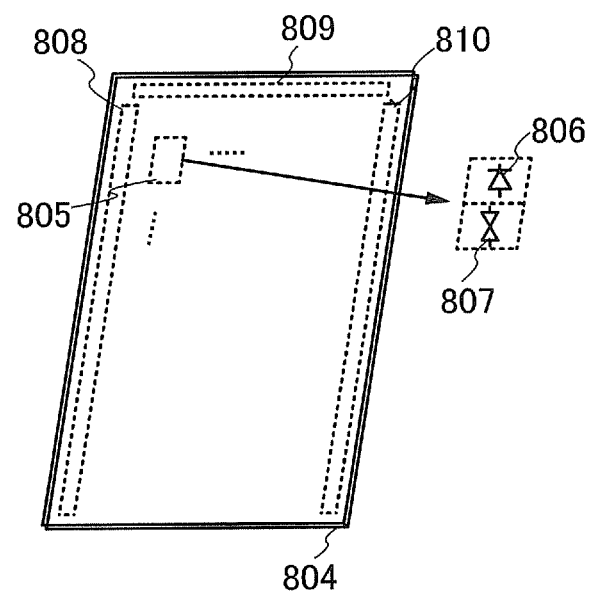

FIG. 8B illustrates a structure of a liquid crystal display device additionally having a touch panel function which is different from that of the liquid crystal display device in FIG. 8A. A liquid crystal display device 804 illustrated in FIG. 8B includes a plurality of pixels 805 each provided with an optical sensor 806 and a liquid crystal element 807. Thus, it is not necessary to form the touch panel unit 802 so as to overlap with the liquid crystal display device 804 unlike in the structure of FIG. 8A, which leads to reduction in thickness of the liquid crystal display device. A gate line driver circuit 808, a signal line driver circuit 809, and an optical sensor driver circuit 810 are formed over a substrate over which the pixels 805 are provided, whereby the liquid crystal display device can be reduced in size. Note that the optical sensor 806 may be formed using amorphous silicon or the like so as to overlap with a thin film transistor including an oxide semiconductor.

According to this embodiment, a thin film transistor including an oxide semiconductor is used for a liquid crystal display device having a touch panel function, whereby an image holding property at the time of displaying a still image can be improved. Further, operation of a driver circuit portion during a still image is displayed is stopped, whereby low power consumption can be achieved.

Figure 13:
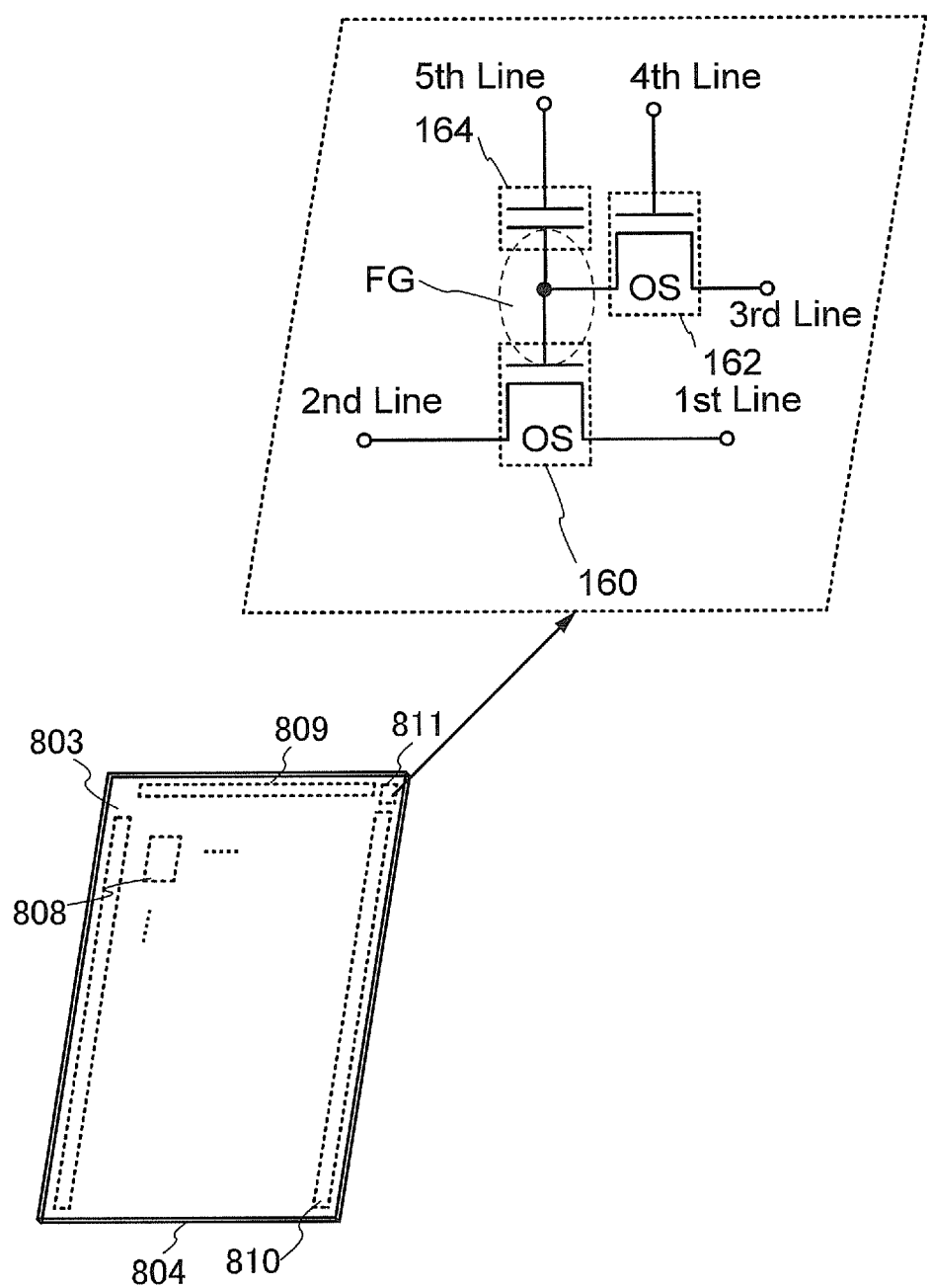
FIG. 13 illustrates a liquid crystal display device according to an embodiment of the present invention.

Alternatively, a memory element provided with a thin film transistor formed using an oxide semiconductor which is the same as that used for a pixel circuit may be provided over each of the display panels in FIGS. 8A and 8B. The memory element provided over the display panel, for example, a touch panel may store data such as a threshold value of an electric signal of a touch portion. As an example, FIG. 13 illustrates a structure where the display panel in FIG. 8B is additionally provided with a memory element 811. FIG. 13 illustrates a structure of a basic memory element. Note that a transistor including an oxide semiconductor is denoted by a symbol "OS" in a circuit diagram of FIG. 13.

In the memory element illustrated in FIG. 13, a gate electrode of a transistor 160 and one of a source electrode and a drain electrode of the transistor 162 are electrically connected to each other. A first wiring (a 1st line, also referred to as a source line) is electrically connected to a source electrode of the transistor 160. A second wiring (a 2nd line, also referred to as a bit line) is electrically connected to a drain electrode of the transistor 160. A third wiring (a 3rd line, also referred to as a first signal line) is electrically connected to the other of the source electrode and the drain electrode of the transistor 162. A fourth wiring (a 4th line, also referred to as a second signal line) is electrically connected to a gate electrode of the transistor 162. The gate electrode of the transistor 160 and one of the source electrode and the drain electrode of the transistor 162 are electrically connected to one of electrodes of a capacitor 164. A fifth wiring (a 5th line, also referred to as a word line) is electrically connected to the other of the electrodes of the capacitor 164.

An off current is extremely low in the transistor 160 and the transistor 162 each including an oxide semiconductor. For that reason, a potential of the gate electrode of the transistor 160 can be held for an extremely long time by turning off the transistor 162. Provision of the capacitor 164 facilitates holding of charge given to the gate electrode of the transistor 160 and reading of stored data.

The memory element described in this embodiment makes use of a characteristic in which the potential of the gate electrode of the transistor 160 can be held, thereby writing, storing, and reading data as follows.

Firstly, writing and holding of data will be described. First, a potential of the fourth wiring is set to a potential at which the transistor 162 is turned on, so that the transistor 162 is turned on. Thus, a potential of the third wiring is supplied to the gate electrode of the transistor 160. That is, predetermined charge is given to the gate electrode of the transistor 160 (writing). After that, the potential of the fourth wiring is set to a potential at which the transistor 162 is turned off, so that the transistor 162 is turned off. Thus, the charge given to the gate electrode of the transistor 160 is held (storing).

Since the off current of the transistor 162 is significantly low, the charge of the gate electrode of the transistor 160 is held for a long time. For example, a potential at which the transistor 160 is turned on is supplied to the gate electrode of the transistor 160 while a reading potential is supplied to the fifth wiring, whereby an on state of the transistor 160 is kept for a long time. In a similar manner, a potential at which the transistor 160 is turned off is supplied to the gate electrode of the transistor 160, whereby an off state of the transistor 160 is kept for a long time. Here, a reading potential refers to a potential of the fifth wiring, at which the transistor 160 is turned on or off depending on charges held in the gate electrode.

Secondly, reading of data will be described. When an on state or an off state of the transistor 160 is kept as described above, a reading potential is supplied to the fifth wiring, and a given potential (a low potential) is applied to the first wiring, a value of a potential of the second wiring varies depending on whether the transistor 160 is on or off. For example, when the transistor 160 is on, the potential of the second wiring is lower than the potential of the first wiring. In contrast, when the transistor 160 is off, the potential of the second wiring is not changed.

In this manner, by comparing the potential of the first wiring with the potential of the second wiring in a state where data is stored, the data can be read out.

In the case where data is not read out, a potential at which the transistor 160 is turned off (or on) regardless of charge held in the gate electrode may be supplied to the fifth wiring.

Next, rewriting of data will be described. Data rewriting is performed similarly to the writing or storing of data. That is, the potential of the fourth line is set to a potential at which the transistor 162 is turned on, whereby the transistor 162 is turned on. Accordingly, the potential of the third line (potential related to new data) is supplied to the gate electrode of the transistor 160. After that, the potential of the fourth line is set to a potential at which the transistor 162 is turned off, whereby the transistor 162 is turned off. Consequently, new data is stored.

In the memory element illustrated in FIG. 13, data can be directly rewritten by another writing of data as described above. For that reason, erasing operation which is necessary for a flash memory or the like is not needed, so that a reduction in operation speed because of erasing operation can be prevented. That is, high-speed operation of the memory element can be achieved.

Note that the source electrode or the drain electrode of the transistor 162 is electrically connected to the gate electrode of the transistor 160, thereby having an effect similar to that of a floating gate of a floating gate transistor used for a nonvolatile memory element. Therefore, a portion in the drawing where the source electrode or the drain electrode of the transistor 162 is electrically connected to the gate electrode of the transistor 160 is called a floating gate portion FG in some cases. When the transistor 162 is off, the floating gate portion FG can be regarded as being embedded in an insulator and thus charge is held in the floating gate portion FG. The amount of off current of the transistor 162 including an oxide semiconductor is lower than or equal to one hundred thousandth of the amount of off current of a transistor including a silicon semiconductor; thus, lost of the charge accumulated in the floating gate portion FG due to a leakage current of the transistor 162 is negligible.

With such a structure, the problem of deterioration of a gate insulating film (tunnel insulating film), which is pointed out in a conventional floating gate transistor, can be avoided. That is to say, the problem of deterioration of a gate insulating film due to injection of an electron into a floating gate, which has been a concern, can be solved. Thus, in the memory element illustrated in FIG. 13, there is no limit on the number of times of writing in principle.

This embodiment can be combined with any of the other embodiments as appropriate.

(Embodiment 4)

In this embodiment, examples of electronic equipment including the liquid crystal display device described in any of the embodiments will be described.

Figure 9A:
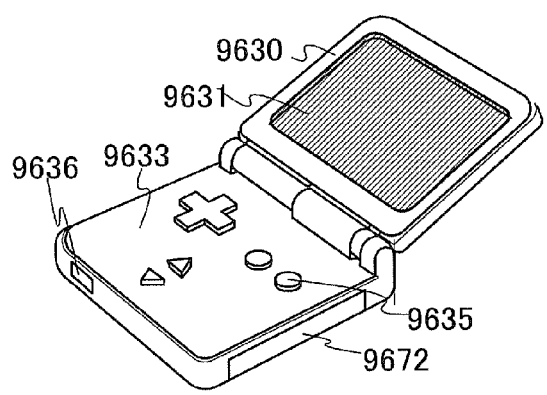
FIGS. 9A to 9D each illustrate electronic equipment according to an embodiment of the present invention.

FIG. 9A illustrates a portable game machine which can include a housing 9630, a display portion 9631, speakers 9633, operation keys 9635, a connection terminal 9636, a recording medium reading portion 9672, and the like. The portable game machine illustrated in FIG. 9A can have a function of reading a program or data stored in a recording medium to display it on the display portion; a function of sharing data by wireless communication with another portable game machine; and the like. The portable game machine in FIG. 9A can have various functions without limitation to the above.

Figure 9B:
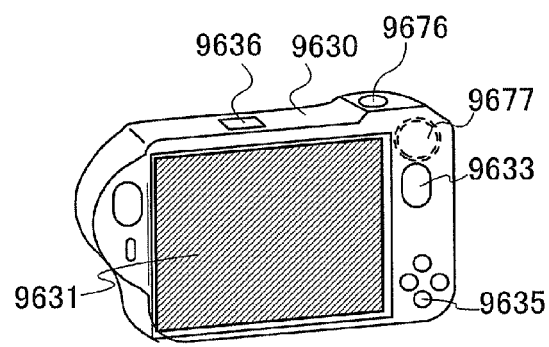

FIG. 9B illustrates a digital camera which can include a housing 9630, a display portion 9631, speakers 9633, operation keys 9635, a connection terminal 9636, a shutter button 9676, an image receiving portion 9677, and the like. The digital camera illustrated in FIG. 9B can have various functions such as a function of shooting a still image; a function of shooting a moving image; a function of automatically or manually adjusting the shot image; a function of obtaining various kinds of data from an antenna; a function of storing the shot image or the data obtained from the antenna; and a function of displaying the shot image or the data obtained from the antenna on the display portion. Note that the functions of the digital camera illustrated in FIG. 9B are not limited to those, and the digital camera can have other various functions.

Figure 9C:
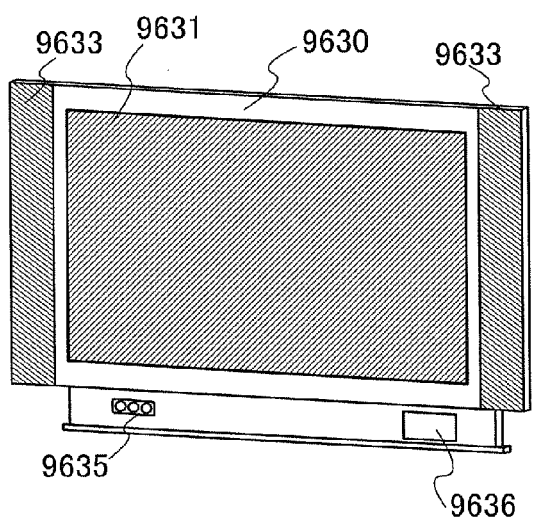

FIG. 9C illustrates a television set which can include a housing 9630, a display portion 9631, speakers 9633, operation keys 9635, a connection terminal 9636, and the like. The television set shown in FIG. 9C has a function of processing electric waves for television and converting the electric waves into an image signal, a function of processing the image signal and converting the image signal into a signal suitable for display, a function of converting a frame frequency of the image signal, and the like. Note that the television set illustrated in FIG. 9C can have a variety of functions without limitation to the above.

Figure 9D:
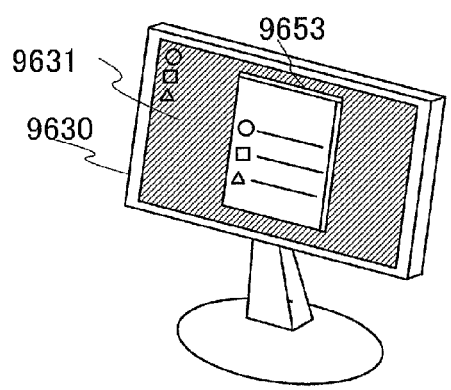

FIG. 9D illustrates a monitor for an electronic computer (personal computer), which can include a housing 9630, a display portion 9631, and the like. As for the monitor illustrated in FIG. 9D, a window-type display portion 9653 is in the display portion 9631. Note that although the window-type display portion 9653 is provided in the display portion 9631 for illustration, a different symbol such as an icon or an image may be employed. In the case of a monitor for a personal computer, an image signal is rewritten only at the time of inputting in many cases, which is favorable when the method for driving a liquid crystal display device, according to any of the above embodiments, is applied. Note that the monitor illustrated in FIG. 9D can have various functions without limitation to the above.

Figure 10A:
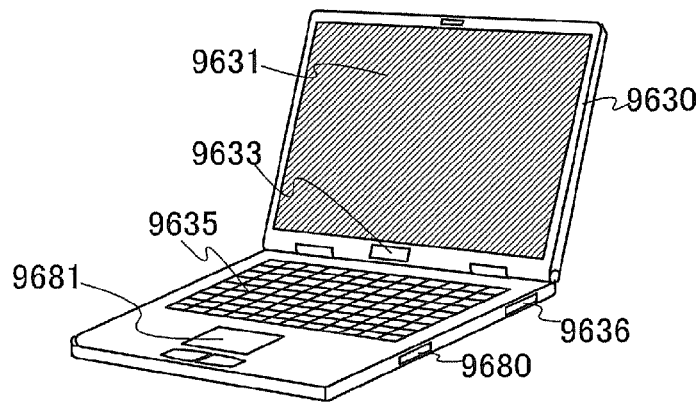
FIGS. 10A to 10D each illustrate electronic equipment according to an embodiment of the present invention.

FIG. 10A illustrates a computer which can include a housing 9630, a display portion 9631, a speaker 9633, operation keys 9635, a connection terminal 9636, a pointing device 9681, an external connecting port 9680, and the like. The computer illustrated in FIG. 10A can have a function of displaying a variety of kinds of data (e.g., a still image, a moving image, and a text image) on the display portion; a function of controlling processing by a variety of kinds of software (programs); a communication function such as wireless communication or wire communication; a function of connecting to various computer networks with the use of the communication function; a function of transmitting or receiving a variety of kinds of data with the use of the communication function; and the like. Note that the functions of the computer illustrated in FIG. 10A are not limited to those, and the computer can have other various functions.

Figure 10B:
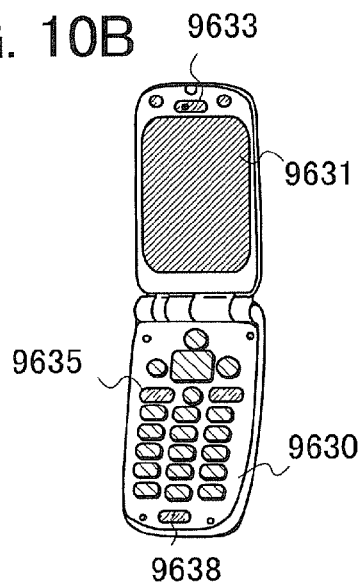

FIG. 10B illustrates a mobile phone which can include a housing 9630, a display portion 9631, a speaker 9633, operation keys 9635, a microphone 9638, and the like. The mobile phone illustrated in FIG. 10B can have a function of displaying a variety of kinds of data (e.g., a still image, a moving image, and a text image) on the display portion; a function of displaying a calendar, a date, the time, and the like on the display portion; a function of operating or editing the data displayed on the display portion; a function of controlling processing by various kinds of software (programs); and the like. Note that the mobile phone illustrated in FIG. 10B can have other various functions without limitation to the above.

Figure 10C:
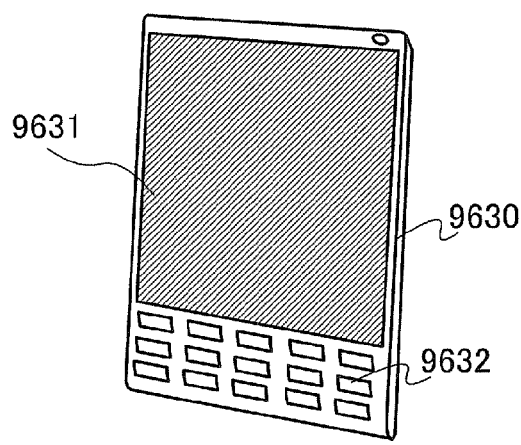
Figure 10D:
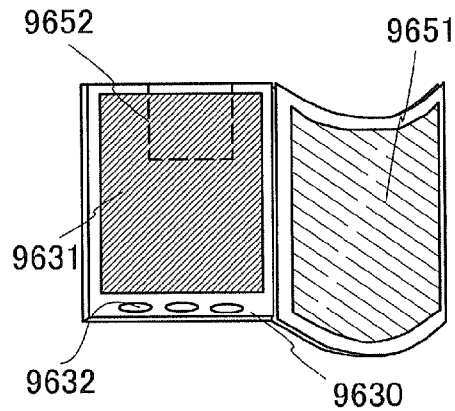

FIG. 10C illustrates electronic paper (also referred to as an eBook or an e-book reader) that can include a housing 9630, a display portion 9631, operation keys 9632, and the like. The electronic paper in FIG. 10C can have a function of displaying a variety of kinds of data (e.g., a still image, a moving image, and a text image) on the display portion; a function of displaying a calendar, a date, the time, and the like on the display portion; a function of operating or editing the data displayed on the display portion; a function of controlling processing with the use of various kinds of software (programs); and the like. Note that the electronic paper in FIG. 10C can have other various functions without limitation to the above. FIG. 10D illustrates another electronic paper. The electronic paper in FIG. 10D includes a solar cell 9651 and a battery 9652 in addition to components of the electronic paper in FIG. 10C. In the case of using a reflective liquid crystal display device as the display portion 9631, the reflective liquid crystal display device is expected to be used when ambient light is relatively bright, and power generation by the solar cell 9651 and charge of the battery 9652 are efficiently performed, which is favorable. Note that it is advantageous to use a lithium ion battery as the battery 9652 because reduction in size can be achieved, for example.

In the electronic equipment described in this embodiment, low power consumption can be achieved in displaying a still image.

This embodiment can be implemented in appropriate combination with any of the structures described in the other embodiments.

This application is based on Japanese Patent Application serial no. 2009-287957 filed with Japan Patent Office on Dec. 18, 2009, the entire contents of which are hereby incorporated by reference.

EXPLANATION OF REFERENCE

10: pulse output circuit, 11: first wiring, 12: second wiring, 13: third wiring, 14: fourth wiring, 15: fifth wiring, 17: sixth wiring, 18: seventh wiring, 21: first input terminal, 22: second input terminal, 23: third input terminal, 24: fourth input terminal, 25: fifth input terminal, 26: first output terminal, 27: second output terminal, 31: first transistor, 32: second transistor, 33: third transistor, 34: fourth transistor, 35: fifth transistor, 36: sixth transistor, 37: seventh transistor, 38: eighth transistor, 39: ninth transistor, 40: tenth transistor, 41: eleventh transistor, 51: power supply line, 52: power supply line, 61: period, 62: period, 100: liquid crystal display device, 101: display panel, 102: memory circuit, 103: comparator circuit, 104: display control circuit, 105: driver circuit portion, 106: pixel circuit portion, 107A: gate line driver circuit, 107B: signal line driver circuit, 108: frame memory, 109: selection circuit, 110: common electrode portion, 111: switching transistor, 221: pixel electrode, 222: common electrode, 223: liquid crystal, 160: transistor, 162: transistor, 164: capacitor, 201: first substrate, 202: second substrate, 203: pixel circuit portion, 204: gate line driver circuit, 205: signal line driver circuit, 206: terminal portion, 206A: terminal, 206B: terminal, 207: switching transistor, 208: common connection portion, 209: common electrode, 210: capacitor, 211: gate line, 212: signal line, 213: pixel, 214: transistor, 215: liquid crystal element, 221: pixel electrode, 222: common electrode, 223: liquid crystal, 401: period, 402: period, 403: period, 404: period, 601: period, 602: period, 603: period, 604: period, 801: liquid crystal display panel, 802: touch panel unit, 803: housing, 804: liquid crystal display device, 805: pixel, 806: optical sensor, 807: liquid crystal element, 808: gate line driver circuit, 809: signal line driver circuit, 810: optical sensor driver circuit, 811: memory element, 1200: signal line driver circuit, 1201: gate line driver circuit, 1202: pixel circuit, 1204: second substrate, 1205: sealing material, 1206: alignment film, 1207: alignment film, 1208 connection wiring, 1210: first substrate, 1211: pixel transistor, 1214: insulating layer, 1223: driver circuit thin film transistor, 1235: resin layer, 1240: terminal portion, 1241: connection terminal, 1242: connection wiring, 1243: connection terminal, 1250: pixel electrode, 1255: pillar spacer, 1261: switching transistor, 1270: conductive particle, 1280: liquid crystal, 1290: first polarizing plate, 1291: common electrode, 1293: conductive layer, 1295: second polarizing plate, 9630: housing, 9631: display portion, 9632: operation key, 9633: speaker, 9635: operation key, 9636: connection terminal, 9638: microphone, 9651: solar cell, 9652: battery, 9653: window-type display portion, 9672: recording medium reading portion, 9676: shutter button, 9677: image receiving portion, 9680: external connecting port, and 9681: pointing device.

The invention claimed is:

1. A driving method of a display device having a touch panel function, the display device comprising:
    a display panel comprising a pixel circuit portion, the pixel circuit portion comprising a pixel electrode and a transistor electrically connected to the pixel electrode, wherein the transistor comprises an oxide semiconductor layer including a channel formation region, wherein the oxide semiconductor layer comprises indium and zinc;

the driving method comprising:

displaying a moving image in a first period at a first refresh rate; and displaying a still image in a second period at a second refresh rate which is smaller than the first refresh rate, wherein an off current per micrometer in a channel width of the transistor is less than or equal to $1\times10^{-17}$ A/μm.

2. The driving method according to claim 1, wherein the off current is at a room temperature.

3. The driving method according to claim 1, wherein the display panel is a liquid crystal device.

4. The driving method according to claim 1, wherein the display panel is a reflective type liquid crystal device.

5. The driving method according to claim 1, wherein the touch panel function is a surface capacitive type.

6. The driving method according to claim 1, wherein the touch panel function is provided by a touch panel superimposed on the display panel.

7. The driving method according to claim 1, wherein the touch panel function is provided by a sensor provided in the display panel.

8. The driving method according to claim 7, wherein the sensor is an optical sensor.

9. A driving method of a display device having a touch panel function, the display device comprising:

a display panel comprising a pixel circuit portion and a gate line driver circuit for driving the pixel circuit portion;

the driving method comprising:

displaying a moving image in a first period at a first refresh rate;

stopping supply of a start pulse to the gate line driver circuit in a second period after the first period;

stopping supply of a clock signal to the gate line driver circuit in the second period after stopping the supply of the start pulse; and displaying a still image in a third period after the second period at a second refresh rate which is smaller than the first refresh rate, wherein the pixel circuit portion comprises a pixel electrode and a first transistor electrically connected to the pixel electrode, the first transistor comprising a first oxide semiconductor layer including a channel formation region over a substrate, wherein the first oxide semiconductor layer comprises indium and zinc, and wherein the gate line driver circuit comprises a second transistor, the second transistor comprising a second oxide semiconductor layer including a channel formation region over the substrate.

10. The driving method according to claim 9, wherein an off current per micrometer in a channel width of the first transistor is less than or equal to $1\times10^{-17}$ A/μm, and wherein the off current is at a room temperature.

11. The driving method according to claim 9, wherein supply of a high power supply potential and a low power supply potential to the gate line driver circuit is continued during displaying the still image in the third period.

12. The driving method according to claim 9, wherein the display panel is a reflective type liquid crystal device.

13. The driving method according to claim 9, wherein the second transistor comprises a gate electrode and a conductive layer over the gate electrode with the channel formation region of the second oxide semiconductor layer interposed therebetween, the gate electrode and the conductive layer being supplied with a same potential.

14. The driving method according to claim 9, wherein the touch panel function is a surface capacitive type.

15. The driving method according to claim 9, wherein the touch panel function is provided by a touch panel superimposed on the display panel.

16. The driving method according to claim 9, wherein the touch panel function is provided by a sensor provided in the display panel.

17. The driving method according to claim 16, wherein the sensor is an optical sensor.

18. A display device comprising:

a display panel comprising a pixel circuit portion and a gate line driver circuit for driving the pixel circuit portion;

a comparison circuit configured to compare image signals in each of pixels in order to determine if an image is a moving image or a still image; and a display control circuit configured to control operation of the gate line driver circuit in accordance with a determination by the comparison circuit, wherein, when the image is a moving image, the display control circuit is configured to control the gate line driver circuit so that the moving image is displayed at a first refresh rate, wherein, when the image is a still image, the display control circuit is configured to control the gate line driver circuit so that the still image is displayed at a second refresh rate smaller than the first refresh rate, wherein the pixel circuit portion comprises a pixel electrode and a first transistor electrically connected to the pixel electrode, the first transistor comprising a first oxide semiconductor layer including a channel formation region over a substrate, wherein the gate line driver circuit comprises a second transistor, the second transistor comprising a second oxide semiconductor layer including a channel formation region over the substrate, and wherein an off current per micrometer in a channel width of the first transistor is less than or equal to $1\times10^{-17}$ A/μm.

19. The display device according to claim 18, wherein the off current is at a room temperature.

20. The display device according to claim 18, wherein supply of a high power supply potential and a low power supply potential to the gate line driver circuit is continued during displaying the still image.

21. The display device according to claim 18, wherein the display panel is a reflective type liquid crystal device.

22. The display device according to claim 18, wherein the second transistor comprises a gate electrode and a conductive layer over the gate electrode with the channel formation region of the second oxide semiconductor layer interposed therebetween, the gate electrode and the conductive layer being supplied with a same potential.

* * * * *